US011660741B2

(12) United States Patent
Lee et al.

(10) Patent No.: US 11,660,741 B2
(45) Date of Patent: May 30, 2023

(54) ROBOT

(71) Applicant: LG ELECTRONICS INC., Seoul (KR)

(72) Inventors: Iljae Lee, Seoul (KR); Chungin Jung, Seoul (KR); Hoseong Kang, Seoul (KR); Taiwoo Kim, Seoul (KR); Sunil Cho, Seoul (KR); Sunghee Han, Seoul (KR); Seungjong Park, Seoul (KR); Jaeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 519 days.

(21) Appl. No.: 16/845,503

(22) Filed: Apr. 10, 2020

(65) Prior Publication Data
US 2021/0170570 A1    Jun. 10, 2021

(30) Foreign Application Priority Data

Dec. 5, 2019   (KR) .......................... 10-2019-0161024

(51) Int. Cl.
*B25J 9/12* (2006.01)
*B25J 5/00* (2006.01)
*B25J 9/00* (2006.01)
*B25J 19/02* (2006.01)
*B25J 19/00* (2006.01)

(52) U.S. Cl.
CPC .............. *B25J 5/007* (2013.01); *B25J 9/0009* (2013.01); *B25J 9/12* (2013.01); *B25J 19/005* (2013.01); *B25J 19/022* (2013.01)

(58) Field of Classification Search
CPC . H05K 7/1432; H05K 7/20136; B25J 19/022; B25J 9/12; B25J 5/007; B25J 9/0009; B25J 19/005
See application file for complete search history.

(56) References Cited

U.S. PATENT DOCUMENTS

| 11,351,073 | B2 * | 6/2022  | Son  | A61G 5/04   |
|------------|------|---------|------|-------------|
| 11,383,387 | B2 * | 7/2022  | Youn | B25J 9/0009 |
| 2019/0282055 | A1 * | 9/2019  | Lee  | A47L 9/2842 |
| 2019/0290088 | A1 * | 9/2019  | Goto | A47L 11/283 |
| 2019/0380552 | A1 * | 12/2019 | Han  | G05D 1/0225 |
| 2020/0009740 | A1 * | 1/2020  | Youn | B25J 11/0005 |
| 2021/0170610 | A1 * | 6/2021  | Kang | B25J 9/0009 |

OTHER PUBLICATIONS

Zang et al., Development of a multi-linked tracked jack robot, 2014, IEEE, p. 1769-1774 (Year: 2014).*

(Continued)

*Primary Examiner* — McDieunel Marc
(74) *Attorney, Agent, or Firm* — Birch, Stewart, Kolasch & Birch, LLP

(57) ABSTRACT

A robot includes a housing, a body frame disposed inside the housing, a driving motor provided at lower portion of the body frame, a driving wheel rotated by the driving motor and protruding downward of the housing, a control rack mounted to the body frame and positioned above the driving motor, an opening defined in the housing and positioned at a rear side of the control rack, the control rack being insertable into the opening, and a back cover covering the opening.

20 Claims, 20 Drawing Sheets

(56) References Cited

OTHER PUBLICATIONS

Choi et al., A remotely operated mobile robot with modular track mechanisms, 2007, IEEE, p. 1002-1005 (Year: 2007).*
Dong et al., Nonlinear control design for row guidance system of an automated asparagus harvesting robot, 2011, IEEE, p. 1087-1092 (Year: 2011).*
Wada, Omnidirectional Control of 4WD Robotic Base, 2007, IEEE, pg. (Year: 2007).*

* cited by examiner

ROBOT

CROSS-REFERENCE TO RELATED APPLICATIONS

The present application claims the priority benefit of Korean Patent Application No. 10-2019-0161024 filed in the Republic of Korea on Dec. 5, 2019, which is hereby incorporated by reference in its entirety for all purposes as if fully set forth herein.

BACKGROUND

The present disclosure relates to a robot capable of autonomous driving.

In order to manage a part of factory automation, robots have been developed for industrial use. Recently, the application of robots has been further expanded. Not only medical robots and aerospace robots but also robots that can be used in daily life are being developed.

Such robots for daily life provide specific services (e.g., shopping, serving, talking, cleaning, etc.) in response to a user's command.

However, the existing robots for daily life are designed to provide only a specific service. Therefore, the utilization is not high as compared with the cost for the investment in developing robots.

Therefore, there is a need for a robot capable of providing various services.

SUMMARY

The present disclosure provides a robot whose maintenance is facilitated.

In one embodiment, a robot may include a body frame disposed inside a housing, a control rack mounted to the body frame, and an opening which is defined in the housing and through which the control rack can enter and exit.

In more detail, the robot may include a housing, a body frame disposed inside the housing, a driving motor provided at lower portion of the body frame, a driving wheel configured to be rotated by the driving motor and protruding downward of the housing, a control rack mounted to the body frame and positioned above the driving motor, an opening defined in the housing and positioned at a rear side of the control rack, the control rack being insertable into the opening, and a back cover configured to cover the opening.

The body frame may include a base, an inner plate spaced upward from the base and configured to support the control rack, and a top cover spaced upward from the inner plate, with the control rack being disposed therebetween.

A pad contacting the control rack may be attached to an upper surface of the inner plate, and the pad may include an elastic layer having an elastic material and an insulator layer positioned above the elastic layer, contacting the control rack, and having a lower coefficient of friction than that of the elastic layer.

The body frame may further include a plurality of pillars configured to support the top cover and positioned at both sides of the control rack.

At least a portion of the plurality of pillars may guide the front and rear movement of the control rack.

The body frame may further include a separation prevention frame configured to support the top cover, positioned behind the control rack, and positioned in front of the opening.

The separation prevention frame may be coupled to the top cover by a knob bolt.

The control rack may include a rack housing having an opened back surface, a plurality of substrates disposed inside the rack housing, and a coupling bracket coupling a rear end of the rack housing to the body frame.

The control rack may further include a heat dissipation fan coupled to the rack housing and configured to blow air to the substrates through a through hole defined in the rack housing.

A damper including an elastic material may be provided between the coupling bracket and the body frame.

The inner plate may be provided with a stepped portion that is stepped downward so as to be spaced apart from a bottom surface of the control rack, is formed long in a front-and-rear direction (i.e., longitudinal direction), and is opened with respect to a front side.

The robot may further include a blowing fan configured to generate an air flow passing between the stepped portion and the control rack and positioned in front of the control rack, and an air guide configured to guide the air flow generated by the blowing fan to a discharge port defined in the housing.

The housing may be provided with a recessed portion which is recessed rearward from a front surface of the housing and in which a lidar is disposed, and the discharge port may be defined on an upper surface of the recessed portion.

The robot may further include a battery mounted to the body frame, positioned above the driving motor, and positioned below the control rack.

In one embodiment, a robot may include a housing, a base disposed inside the housing, a driving motor disposed in the base, a driving wheel rotated by the driving motor and protruding downward of the housing, an inner plate spaced upward from the base, a top cover spaced upward from the inner plate, a battery disposed between the base and the inner plate, a control rack disposed between the inner plate and the top cover, an opening defined in the housing and positioned at a rear side of the control rack, the control rack being insertable into the opening, and a back cover configured to cover the opening.

The robot may further include a plurality of pillars each having an upper end coupled to the top cover and a lower end coupled to the base or the inner plate, and the plurality of pillars each are positioned outside the control rack and/or the battery with respect to a horizontal direction.

The inner plate may be provided with a stepped portion that is stepped downward so as to be spaced apart from a bottom surface of the control rack, and an upper surface of the battery may be adjacent to the stepped portion.

A first pad contacting the battery may be provided on an upper surface of the base, a second pad contacting the control rack may be provided on an upper surface of the inner plate, and the first pad and the second pad may each include an elastic layer having an elastic material, and an insulator layer positioned above the elastic layer and having a lower coefficient of friction than that of the elastic layer.

The robot may further include a reinforcing frame configured to support the inner plate and positioned at a rear side of the battery, and a separation prevention frame configured to support the top cover, positioned behind the control rack, and positioned in front of the opening.

The details of one or more embodiments are set forth in the accompanying drawings and the description below.

Other features will be apparent from the description and drawings, and from the claims.

DETAILED DESCRIPTION OF THE EMBODIMENTS

Figure 1:
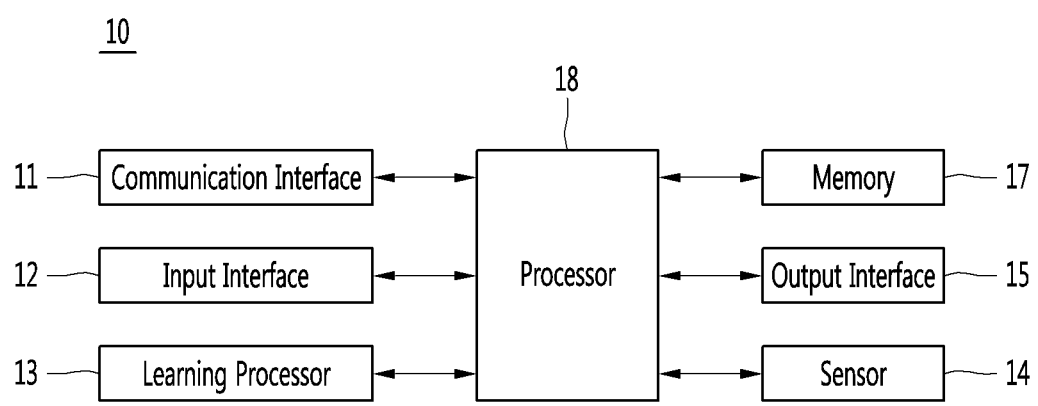
FIG. 1 illustrates an AI device including a robot according to an embodiment of the present disclosure.

Hereinafter, specific embodiments of the present disclosure will be described in detail with reference to the accompanying drawings.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driver including an actuator or a motor and may perform various physical operations such as moving a robot joint. In addition, a movable robot may include a wheel, a brake, a propeller, and the like in a driver, and may travel on the ground through the driver or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device 10 including a robot according to an embodiment of the present disclosure.

The AI device 10 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 10 may include a communication interface 11, an input interface 12, a learning processor 13, a sensor 14, an output interface 15, a memory 17, and a processor 18.

The communication interface 11 may transmit and receive data to and from external devices such as other AI devices 10a to 10e and the AI server 20 by using wire/wireless communication technology. For example, the communication interface 11 may transmit and receive sensor information, a user input, a learning model, and a control signal to and from external devices.

The communication technology used by the communication interface 11 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 12 may acquire various kinds of data.

At this time, the input interface 12 may include a camera for inputting a video signal, a microphone for receiving an audio signal, and a user input interface for receiving information from a user. The camera or the microphone may be treated (i.e., referred to) as a sensor, and the signal acquired from the camera or the microphone may be referred to as sensing data or sensor information.

The input interface 12 may acquire a learning data for model learning and an input data to be used when an output is acquired by using learning model. The input interface 12 may acquire raw input data. In this case, the processor 18 or the learning processor 13 may extract an input feature by preprocessing the input data.

The learning processor 13 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 13 may perform AI processing together with the learning processor 24 of the AI server 20.

At this time, the learning processor 13 may include a memory integrated or implemented in the AI device 10. Alternatively, the learning processor 13 may be implemented by using the memory 17, an external memory directly connected to the AI device 10, or a memory held in an external device.

The sensor 14 may acquire at least one of internal information about the AI device 10, ambient environment information about the AI device 10, and user information by using various sensors.

Examples of the sensors included in the sensor 14 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 15 may generate an output related to a visual sense, an auditory sense, or a haptic sense.

At this time, the output interface 15 may include a display for outputting time information, a speaker for outputting auditory information, and a haptic module for outputting haptic information.

The memory 17 may store data that supports various functions of the AI device 10. For example, the memory 17 may store input data acquired by the input interface 12, learning data, a learning model, a learning history, and the like.

The processor 18 may determine at least one executable operation of the AI device 10 based on information determined or generated by using a data analysis algorithm or a machine learning algorithm. The processor 18 may control the components of the AI device 10 to execute the determined operation.

To this end, the processor 18 may request, search, receive, or utilize data of the learning processor 13 or the memory 17. The processor 18 may control the components of the AI device 10 to execute the predicted operation or the operation determined to be desirable among the at least one executable operation.

When the connection of an external device is required to perform the determined operation, the processor 18 may generate a control signal for controlling the external device and may transmit the generated control signal to the external device.

The processor 18 may acquire intention information for the user input and may determine the user's requirements based on the acquired intention information.

The processor 18 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 13, may be learned by the learning processor 24 of the AI server 20, or may be learned by their distributed processing.

The processor 18 may collect history information including the operation contents of the AI device 100 or the user's feedback on the operation and may store the collected history information in the memory 17 or the learning processor 13 or transmit the collected history information to the external device such as the AI server 20. The collected history information may be used to update the learning model.

The processor 18 may control at least part of the components of AI device 10 so as to drive an application program stored in memory 17. Furthermore, the processor 18 may operate two or more of the components included in the AI device 10 in combination so as to drive the application program.

Figure 2:
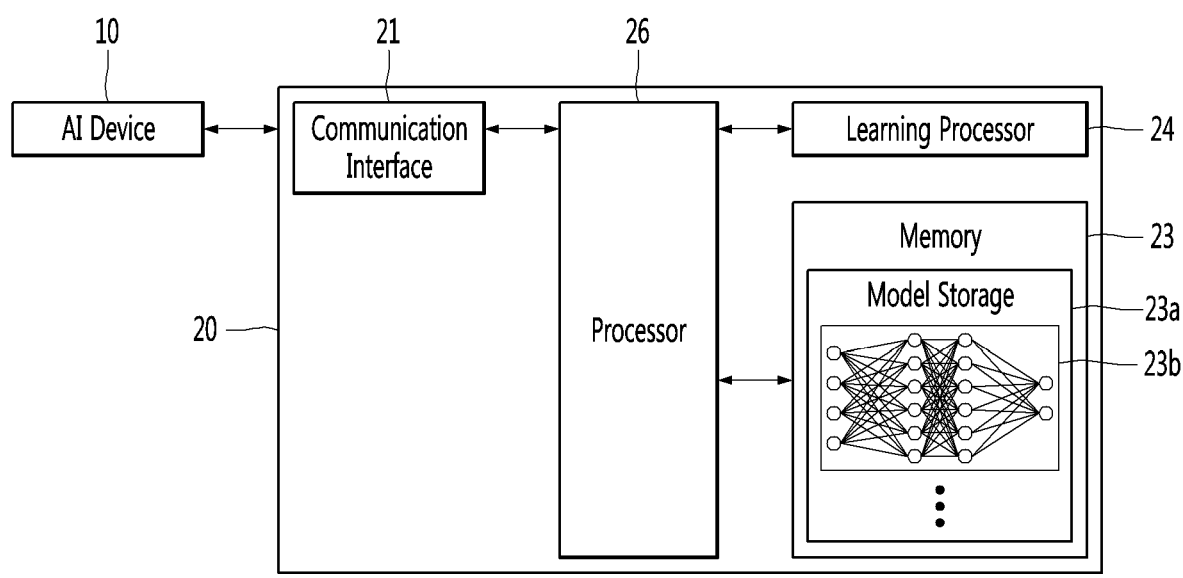
FIG. 2 illustrates an AI server connected to a robot according to an embodiment of the present disclosure.

FIG. 2 illustrates an AI server 20 connected to a robot according to an embodiment of the present disclosure.

Referring to FIG. 2, the AI server 20 may refer to a device that learns an artificial neural network by using a machine learning algorithm or uses a learned artificial neural network. The AI server 20 may include a plurality of servers to perform distributed processing, or may be defined as a 5G network. At this time, the AI server 20 may be included as a partial configuration of the AI device 10, and may perform at least part of the AI processing together.

The AI server 20 may include a communication interface 21, a memory 23, a learning processor 24, a processor 26, and the like.

The communication interface 21 can transmit and receive data to and from an external device such as the AI device 10.

The memory 23 may include a model storage 23a. The model storage 23a may store a learning, learned model or an artificial neural network 23b through the learning processor 24.

The learning processor 24 may learn the artificial neural network 23b by using the learning data. The learning model may be used in a state of being mounted on the AI server 20 of the artificial neural network 23b, or may be used in a state of being mounted on an external device such as the AI device 10.

The learning model may be implemented in hardware, software, or a combination of hardware and software. If all or part of the learning models are implemented in software, one or more instructions that constitute the learning model may be stored in memory 23.

The processor 26 may infer the result value for new input data by using the learning model and may generate a response or a control command based on the inferred result value.

Figure 3:
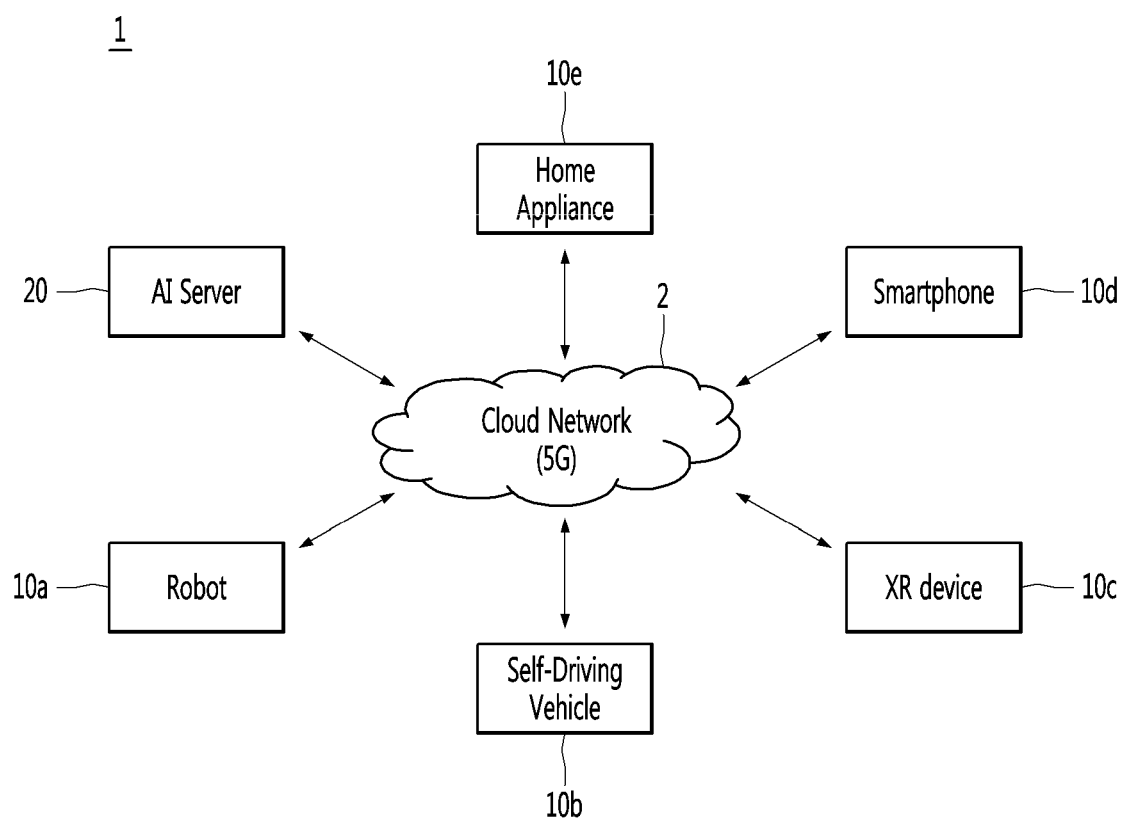
FIG. 3 illustrates an AI system according to an embodiment of the present disclosure.

FIG. 3 illustrates an AI system 1 according to an embodiment of the present disclosure.

Referring to FIG. 3, in the AI system 1, at least one of an AI server 20, a robot 10a, a self-driving vehicle 10b, an XR device 10c, a smartphone 10d, or a home appliance 10e is connected to a cloud network 10. The robot 10a, the self-driving vehicle 10b, the XR device 10c, the smartphone 10d, or the home appliance 10e, to which the AI technology is applied, may be referred to as AI devices 10a to 10e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 10a to 10e and 20 configuring the AI system 1 may be connected to each other through the cloud network 10. In particular, each of the devices 10a to 10e and 20 may communicate with each other through a base station, but may directly communicate with each other without using a base station.

The AI server 20 may include a server that performs AI processing and a server that performs operations on big data.

The AI server 20 may be connected to at least one of the AI devices constituting the AI system 1, that is, the robot 10a, the self-driving vehicle 10b, the XR device 10c, the smartphone 10d, or the home appliance 10e through the cloud network 10, and may assist at least part of AI processing of the connected AI devices 10a to 10e.

At this time, the AI server 20 may learn the artificial neural network according to the machine learning algorithm instead of the AI devices 10a to 10e, and may directly store the learning model or transmit the learning model to the AI devices 10a to 10e.

At this time, the AI server 20 may receive input data from the AI devices 10a to 10e, may infer the result value for the received input data by using the learning model, may generate a response or a control command based on the inferred result value, and may transmit the response or the control command to the AI devices 10a to 10e.

Alternatively, the AI devices 10a to 10e may infer the result value for the input data by directly using the learning model, and may generate the response or the control command based on the inference result.

Hereinafter, various embodiments of the AI devices 10a to 10e to which the above-described technology is applied will be described. The AI devices 10a to 10e illustrated in FIG. 3 may be regarded as a specific embodiment of the AI device 10 illustrated in FIG. 1.

<AI+Robot>

The robot 10a, to which the AI technology is applied, may be implemented as a guide robot, a carrying robot, a cleaning robot, a wearable robot, an entertainment robot, a pet robot, an unmanned flying robot, or the like.

The robot 10a may include a robot control module for controlling the operation, and the robot control module may refer to a software module or a chip implementing the software module by hardware.

The robot 10a may acquire state information about the robot 10a by using sensor information acquired from various kinds of sensors, may detect (recognize) surrounding environment and objects, may generate map data, may determine the route and the travel plan, may determine the response to user interaction, or may determine the operation.

The robot 10a may use the sensor information acquired from at least one sensor among the lidar, the radar, and the camera so as to determine the travel route and the travel plan.

The robot 10a may perform the above-described operations by using the learning model composed of at least one artificial neural network. For example, the robot 10a may recognize the surrounding environment and the objects by using the learning model, and may determine the operation by using the recognized surrounding information or object information. The learning model may be learned directly from the robot 10a or may be learned from an external device such as the AI server 20.

At this time, the robot 10a may perform the operation by generating the result by directly using the learning model, but the sensor information may be transmitted to the external device such as the AI server 20 and the generated result may be received to perform the operation.

The robot 10a may use at least one of the map data, the object information detected from the sensor information, or the object information acquired from the external device to determine the travel route and the travel plan, and may control the driver such that the robot 10*a* travels along the determined travel route and travel plan.

The map data may include object identification information about various objects arranged in the space in which the robot 10*a* moves. For example, the map data may include object identification information about fixed objects such as walls and doors and movable objects such as chairs and desks. The object identification information may include a name, a type, a distance, and a position.

In addition, the robot 10*a* may perform the operation or travel by controlling the driver based on the control/interaction of the user. At this time, the robot 10*a* may acquire the intention information of the interaction due to the user's operation or speech utterance, and may determine the response based on the acquired intention information, and may perform the operation.

<AI+Robot+Self-Driving>

The robot 10*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 10*a*, to which the AI technology and the self-driving technology are applied, may refer to the robot itself having the self-driving function or the robot 10*a* interacting with the self-driving vehicle 10*b*.

The robot 10*a* having the self-driving function may collectively refer to a device that moves for itself along the given movement line without the user's control or moves for itself by determining the movement line by itself.

The robot 10*a* and the self-driving vehicle 10*b* having the self-driving function may use a common sensing method so as to determine at least one of the travel route or the travel plan. For example, the robot 10*a* and the self-driving vehicle 10*b* having the self-driving function may determine at least one of the travel route or the travel plan by using the information sensed through the lidar, the radar, and the camera.

The robot 10*a* that interacts with the self-driving vehicle 10*b* exists separately from the self-driving vehicle 10*b* and may perform operations interworking with the self-driving function of the self-driving vehicle 10*b* or interworking with the user who rides on the self-driving vehicle 10*b*.

At this time, the robot 10*a* interacting with the self-driving vehicle 10*b* may control or assist the self-driving function of the self-driving vehicle 10*b* by acquiring sensor information on behalf of the self-driving vehicle 10*b* and providing the sensor information to the self-driving vehicle 10*b*, or by acquiring sensor information, generating environment information or object information, and providing the information to the self-driving vehicle 10*b*.

Alternatively, the robot 10*a* interacting with the self-driving vehicle 10*b* may monitor the user boarding the self-driving vehicle 10*b*, or may control the function of the self-driving vehicle 10*b* through the interaction with the user. For example, when it is determined that the driver is in a drowsy state, the robot 10*a* may activate the self-driving function of the self-driving vehicle 10*b* or assist the control of the driver of the self-driving vehicle 10*b*. The function of the self-driving vehicle 10*b* controlled by the robot 10*a* may include not only the self-driving function but also the function provided by the navigation system or the audio system provided in the self-driving vehicle 10*b*.

Alternatively, the robot 10*a* that interacts with the self-driving vehicle 10*b* may provide information or assist the function to the self-driving vehicle 10*b* outside the self-driving vehicle 10*b*. For example, the robot 10*a* may provide traffic information including signal information and the like, such as a smart signal, to the self-driving vehicle 10*b*, and automatically connect an electric charger to a charging port by interacting with the self-driving vehicle 10*b* like an automatic electric charger of an electric vehicle.

Figure 4:
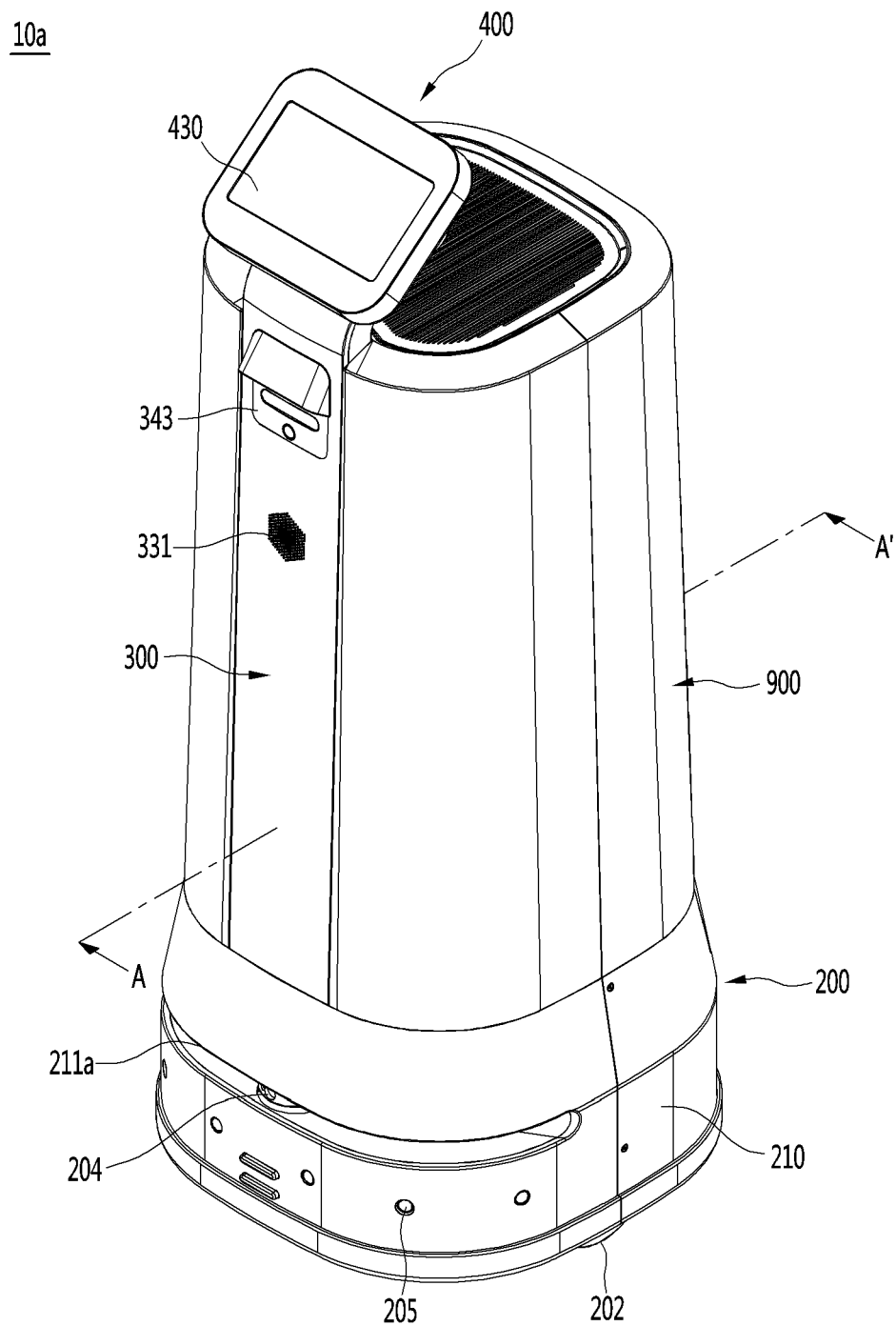
FIG. 4 is a perspective view of a robot according to an embodiment of the present disclosure.
Figure 5:
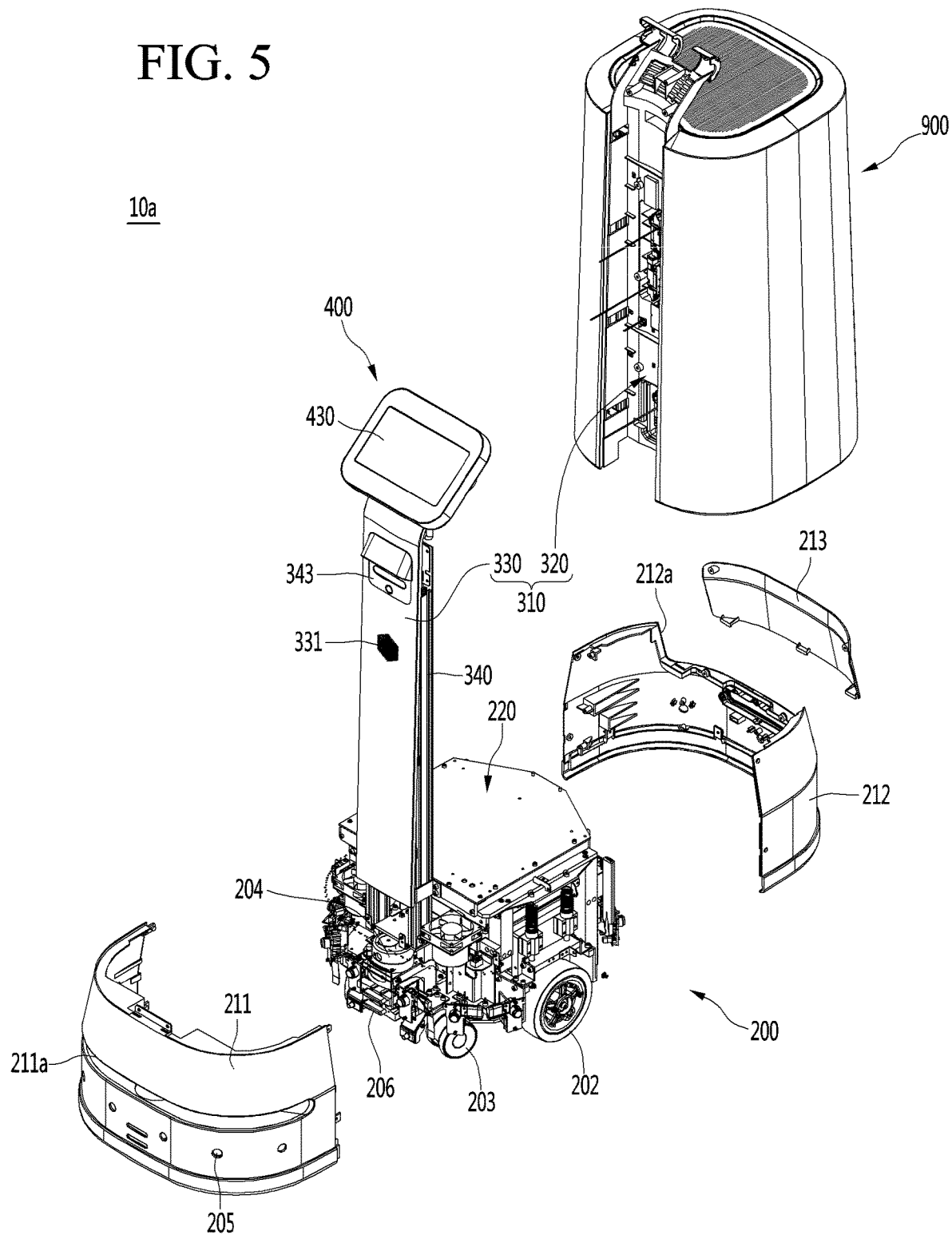
FIG. 5 is an exploded perspective view of the robot according to an embodiment of the present disclosure.
Figure 6:
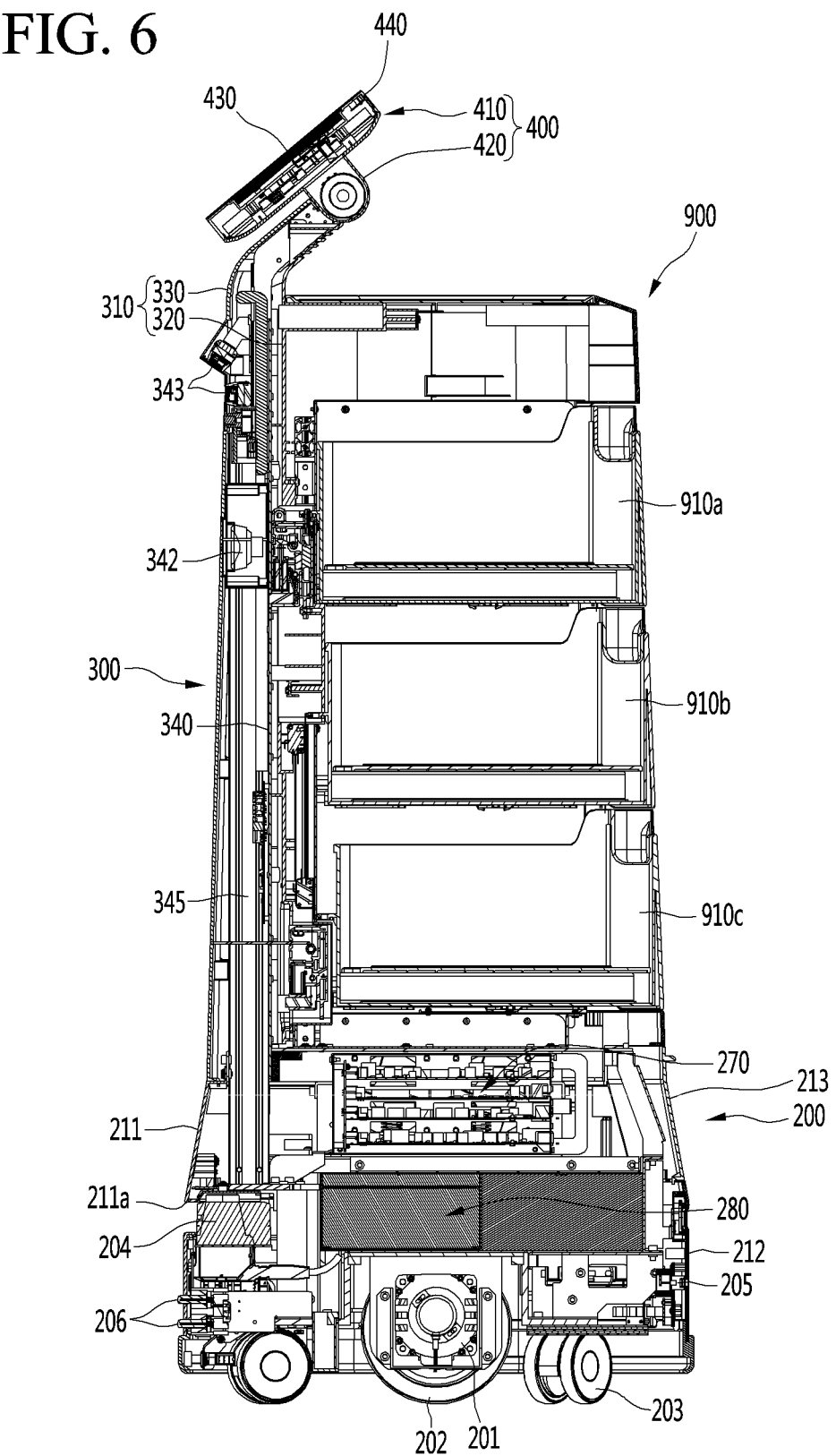
FIG. 6 is a cross-sectional view of the robot taken along line A-A' of FIG. 4.

FIG. 4 is a perspective view of a robot according to an embodiment of the present disclosure, FIG. 5 is an exploded perspective view of the robot according to an embodiment of the present disclosure, and FIG. 6 is a cross-sectional view of the robot taken along line A-A' of FIG. 4.

The robot 10*a* according to the present embodiment may include a main body 200, a neck body 300, and a head 400. The robot 10*a* may further include a service module 900.

The main body 200 may form a base of the robot 10*a*. The main body 200 may be provided with a driving wheel 202 that drives the robot 10*a*. The driving wheel 202 may protrude downward of the main body 200.

In addition, the main body 200 may be provided with one or more casters 203. Each caster 203 may protrude downward from the main body 200 and may assist the driving of the robot 10*a*.

The main body 200 may include a housing 210 and a body frame 220. The main body 200 may further include a back cover 213.

The housing 210 may form the appearance of the main body 200. The housing 210 may form the circumferential surface of the main body 200. The housing 210 may surround the circumference of the body frame 220. That is, the body frame 220 may be disposed inside the housing 210.

The upper surface of the housing 210 may be opened, and the service module 900 to be described below may cover the opened upper surface of the housing 210 from above. The service module 900 may cover the body frame 220 from above. However, the present disclosure is not limited thereto, and the upper surface of the housing 210 may support the service module 900.

The housing 210 may include a front housing 211 and a rear housing 212. Therefore, the work of coupling and separating the housing 210 may be facilitated.

The front housing 211 may be convexly curved forward, and the rear housing 212 may be convexly curved backward. The rear end of the front housing 211 and the front end of the rear housing 212 may be in contact with each other. The outer surface of the front housing 211 and the outer surface of the rear housing 212 may be continuously connected.

An opening 212*a* opened toward the rear side may be defined in the housing 210, and more specifically, the rear housing 212.

The opening 212*a* may cover the back cover 213.

A lidar 204 may be provided in the main body 200. In more detail, the housing 210 may be provided with a recessed portion 211*a* in which the lidar 204 is disposed. The recessed portion 211*a* may be recessed rearward from the front surface of the housing 210, more specifically, the front housing 211. The recessed portion 211*a* is opened toward the front side and may be formed long in the left-and-right direction (i.e., horizontal direction). The lidar 204 may detect an obstacle or a person located in front of the robot 10*a* through the recessed portion 211*a*.

The main body 200 may be provided with a plurality of ultrasonic sensors 205. The plurality of ultrasonic sensors 205 may be spaced apart from each other in the circumferential direction of the main body 200. In more detail, a plurality of openings in which the ultrasonic sensors 205 are disposed may be defined on the outer circumference of the housing 210. Each of the ultrasonic sensors 205 may detect an object around the mobile robot 10a through the opening.

Each ultrasonic sensor 205 may be provided at a lower position than the lidar 204. In more detail, the height of each ultrasonic sensor 205 may be lower than the height of the lidar 204 with respect to the lower end of the main body 200.

The main body 200 may be provided with a terminal 206 configured to charge the robot 10a. A through hole through which the terminal 206 passes may be defined in the housing 210, more specifically, the front housing 211. The terminal 206 may protrude forward from the housing 210 through the through hole.

The robot 10a may dock the terminal 206 to a charger, and the charger may charge a battery 280 embedded in the robot 10a through the terminal 206. The charger may be provided in a wall or a structure of a room where the robot 10a travels.

The terminal 206 may be provided at a lower position than each ultrasonic sensor 205. In more detail, the height of the terminal 206 may be lower than the height of each ultrasonic sensor 205 with respect to the lower end of the main body 200.

A control rack 270 and a battery 280 may be embedded in the main body 200. In more detail, the control rack 270 and the battery 280 may be positioned inside the housing 210 and mounted to the body frame 220.

The control rack 270 may include a plurality of substrates for the operation of the robot 10a. For example, the control rack 270 may include a main control board configured to control the overall operation of the robot 10a and a power board electrically connected to the battery 280. The main control board may include at least one processor 18 (see FIG. 1).

The battery 280 may supply power necessary for the operation of the robot 10a. The battery 280 may be electrically connected to the terminal 206, and charging of the battery 280 may be performed through the terminal 206.

The battery 280 may be positioned below the control rack 270. That is, since the relatively heavy battery 280 is positioned below the main body 200, the center of gravity of the main body 200 can be lowered and the robot can travel stably.

The main body 200 may be provided with a driving motor 201 configured to rotate the driving wheel 202. The driving motor 201 may be provided at the lower portion of the body frame 220. The driving motor 201 may be positioned below the battery 280. The driving motor 201 may be positioned inside the housing 210.

The neck body 300 may extend upward from the front portion of the main body 200. The neck body 300 may be formed vertically. The neck body 300 may protrude upward as compared with the service module 900. The upper portion of the neck body 300 may be bent toward the rear upper side.

The neck body 300 may include a neck housing 310 and a neck plate 340 disposed inside the neck housing 310. The neck body 300 may further include a neck frame 345 (see FIG. 10).

The neck housing 310 may form the appearance of the neck body 300. The neck housing 310 may have an inner space in which the neck plate 340 is disposed.

The neck housing 310 may include a rear case 320 having an opened front side and a front cover 330 configured to cover the opened front side of the rear case 320. The rear case 320 may be coupled to the service module 900.

The neck plate 340 may be positioned between the rear case 320 and the front cover 330. The neck plate 340 may function as a mounter to which various electrical components embedded in the neck housing 310 are mounted.

The front surface of the neck plate 340 may face the rear surface of the front cover 330. The electrical components may be positioned between the neck plate 340 and the front cover 330. Therefore, the operator can easily maintain the electrical components by separating only the front cover 330.

The neck plate 340 may be coupled to and supported by the neck frame 345.

The neck frame 345 may have a vertical bar shape. The neck frame 345 may extend vertically from the main body 200 to the inside of the neck housing 310. That is, the lower end of the neck frame 345 may be coupled to the body frame 220.

The neck frame 345 may be provided as a pair of neck frames 345 spaced apart in the left-and-right direction (i.e., horizontal direction). The neck plate 340 may be coupled to the rear surfaces of the pair of neck frames 345, and electrical components mounted on the front surface of the neck plate 340 may be positioned between the pair of neck frames 345.

The neck body 300 may be provided with a speaker 342. In more detail, the speaker 342 may be mounted to the neck plate 340, and a sound hole 331 facing the speaker 342 may be defined in the front cover 330. A sound generated from the speaker 342 may be transmitted to the outside of the robot 10a through the sound hole 331.

The neck body 300 may be provided with a camera 343. The camera 343 may be a depth camera (e.g., a 3D depth camera). The camera 343 may be disposed above the speaker 342. The camera 343 may be mounted to the neck plate 340, and an opening hole in which the camera 343 is disposed may be defined in the front cover 330.

The head 400 may be connected to the upper end of the neck body 300. The head 400 may be tilted back and forth with respect to the neck body 300. The head 400 may be positioned above the service module 900.

The head 400 may include a display body 410 in which a display 430 is provided, and a protrusion 420 protruding from the display body 410.

The display 430 may be provided on one surface of the display body 410. A preset image or video may be output on the display 430. In addition, the display 430 may include a touch panel and function as an input interface capable of a touch input.

The protrusion 420 may protrude from the other surface of the display body 410. The protrusion 420 may be connected to the upper end of the neck body 300.

The head 400 may be provided with a scanner 440. In more detail, the scanner 440 may be provided on a circumferential surface of the display body 410.

The scanner 440 may include an optical sensor configured to scan a preset code. In one example, scanner 440 may be configured to scan a barcode and/or a QR code, etc. A user may tag the barcode and/or the QR code to the scanner 440 to confirm that the user is an authenticated user and use the robot 10a.

The service module 900 may cover the main body 200 from above. In addition, the service module 900 may cover the neck body 300 from the rear.

The service module 900 may be positioned to be lower than the head 400. In more detail, the height from the upper end of the main body 200 to the head 400 may be greater than the height of the service module 900.

The service module 900 may be changed as necessary. In the present embodiment, a case in which the service module 900 includes a plurality of drawers 910a, 910b, and 910c will be described as an example.

The plurality of drawers 910a, 910b, and 910c may be positioned at different heights. Each of the drawers 910a, 910b, and 910c may slide back and forth. In more detail, the drawers 910a, 910b, and 910c may be opened by sliding backward or may be closed by sliding forward. The robot 10a may autonomously travel in a state in which articles are accommodated in the plurality of drawers 910a, 910b, and 910c.

Figure 7:
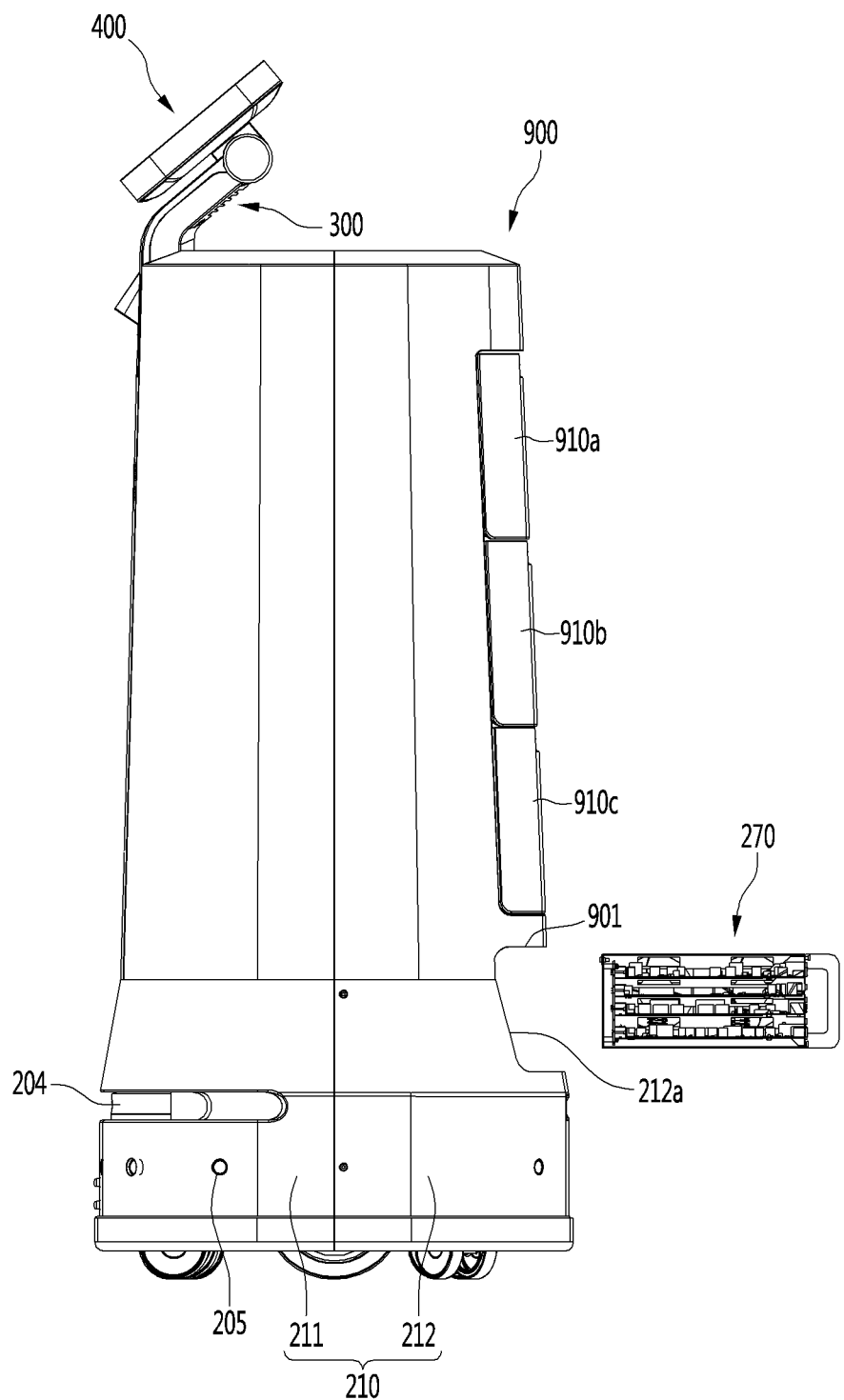
FIG. 7 is a view illustrating a control rack separated from a main body of the robot according to an embodiment of the present disclosure.
Figure 8:
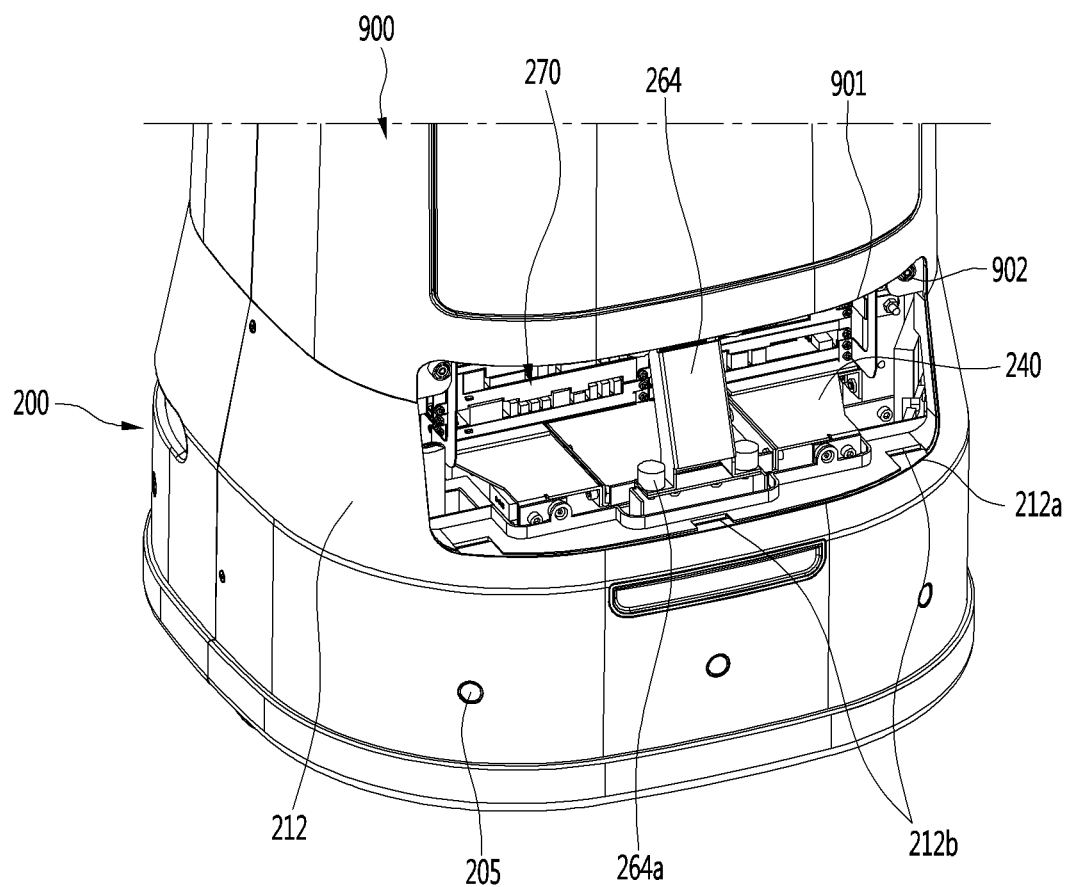
FIG. 8 is a view illustrating a state in which a back cover is separated from an opening of the robot according to an embodiment of the present disclosure.
Figure 9:
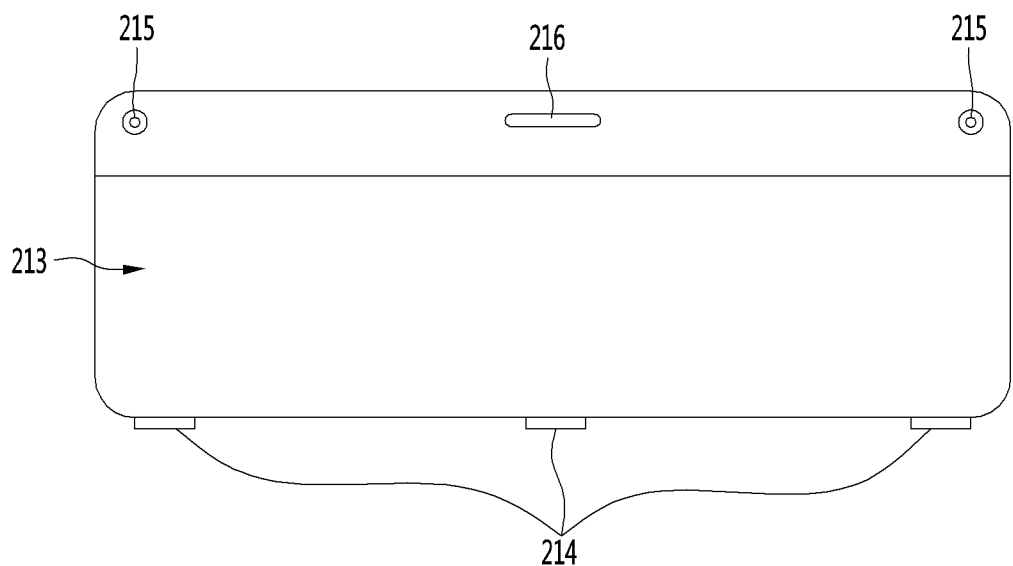
FIG. 9 is a rear view of a back cover of the robot according to an embodiment of the present disclosure.

FIG. 7 is a view illustrating the control rack separated from the main body according to an embodiment of the present disclosure, FIG. 8 is a view illustrating a state in which the back cover is separated from the opening of the robot according to an embodiment of the present disclosure, and FIG. 9 is a rear view of the back cover according to an embodiment of the present disclosure.

A groove 901 connected to the opening 212a defined in the rear housing 212 may be formed at the bottom lower end of the service module 900. The groove 901 may include entrance/exit ports 901 and 212a through which the control rack 270 can enter and exit together with the opening 212a. Thus, the back cover 213 may cover the entrance/exit ports 901 and 212a.

However, the present disclosure is not limited thereto, and the opening 212a may be configured as an entrance/exit port through which the control rack 270 enters and exits alone.

The entrance/exit ports 901 and 212a may be positioned behind the control rack 270. Therefore, the operator may take out the control rack 270 from the main body 200 through the entrance/exit ports 901 and 212a or may insert the control rack 270 into the main body 200 through the entrance/exit ports 901 and 212a.

The body frame 220 may include an inner plate 240 configured to support the control rack 270. The inner plate 240 may be disposed horizontally. The upper surface of the inner plate 240 may be higher than the lower end of the opening 212a. Therefore, the control rack 270 can be easily separated rearward through the entrance/exit ports 212a and 901 above the inner plate 240.

The body frame 220 may be provided with a separation prevention frame 264 positioned between the opening 212a and the control rack 270. The separation prevention frame 264 may be positioned inside the housing 210 and may be positioned behind the control rack 270. Therefore, the separation prevention frame 264 may prevent the control rack 270 from being separated rearward through the entrance/exit ports 901 and 212a.

The operator may separate the back cover 213 from the rear housing 212, separate the separation prevention frame 264 from the body frame 220, and pull the control rack 270 backward to remove the control rack 270 from the main body 200.

In addition, the separation prevention frame 264 may be coupled to the body frame 220 by a knob bolt 264a. Therefore, the operator can easily perform the work of coupling and separating the separation prevention frame 264 through the entrance/exit ports 901 and 212a without using a separate tool.

Meanwhile, one or more fixing ribs 214 may be formed in the back cover 213 (see FIG. 9), and one or more fixing grooves 212b into which a respective fixing rib 214 is inserted may be formed in the housing 210.

Each fixing rib 214 may be formed at the lower end of the back cover 213. The fixing rib 214 may be provided with a plurality of fixing ribs spaced apart from each other along the lower end of the back cover 213.

The fixing groove 212b may be formed in the rear housing 212. In more detail, the fixing groove 212b may be connected to the lower end of the opening 212a. The fixing groove 212b may be provided with a plurality of fixing grooves 212b spaced apart from each other.

Therefore, the lower portion of the back cover 213 may be fixed to the rear housing 212.

In addition, one or more coupling holes 215 may be defined in the back cover 213, and one or more coupling bosses 902 corresponding to the coupling hole 215 may be formed in the service module 900. A coupling member such as a bolt or a screw may be coupled to each coupling boss 902 by passing through the coupling hole 215.

Each coupling hole 215 may be defined in the upper portion of the back cover 213. The coupling hole 215 may be provided with a plurality of coupling holes spaced apart in the left-and-right direction.

The coupling boss 902 may be formed below the service module 900. The coupling boss 902 may be positioned in the groove 901 formed in the service module 900. The coupling boss 902 may be provided with a plurality of coupling bosses so as to correspond to the coupling holes 215.

Therefore, the upper portion of the back cover 213 may be coupled to the service module 900.

When the opening 212a alone constitutes the entrance/exit port through which the control rack 270 enters and exits, the coupling boss 902 may be formed in the housing 210, and more specifically, the rear housing 212.

Figure 10:
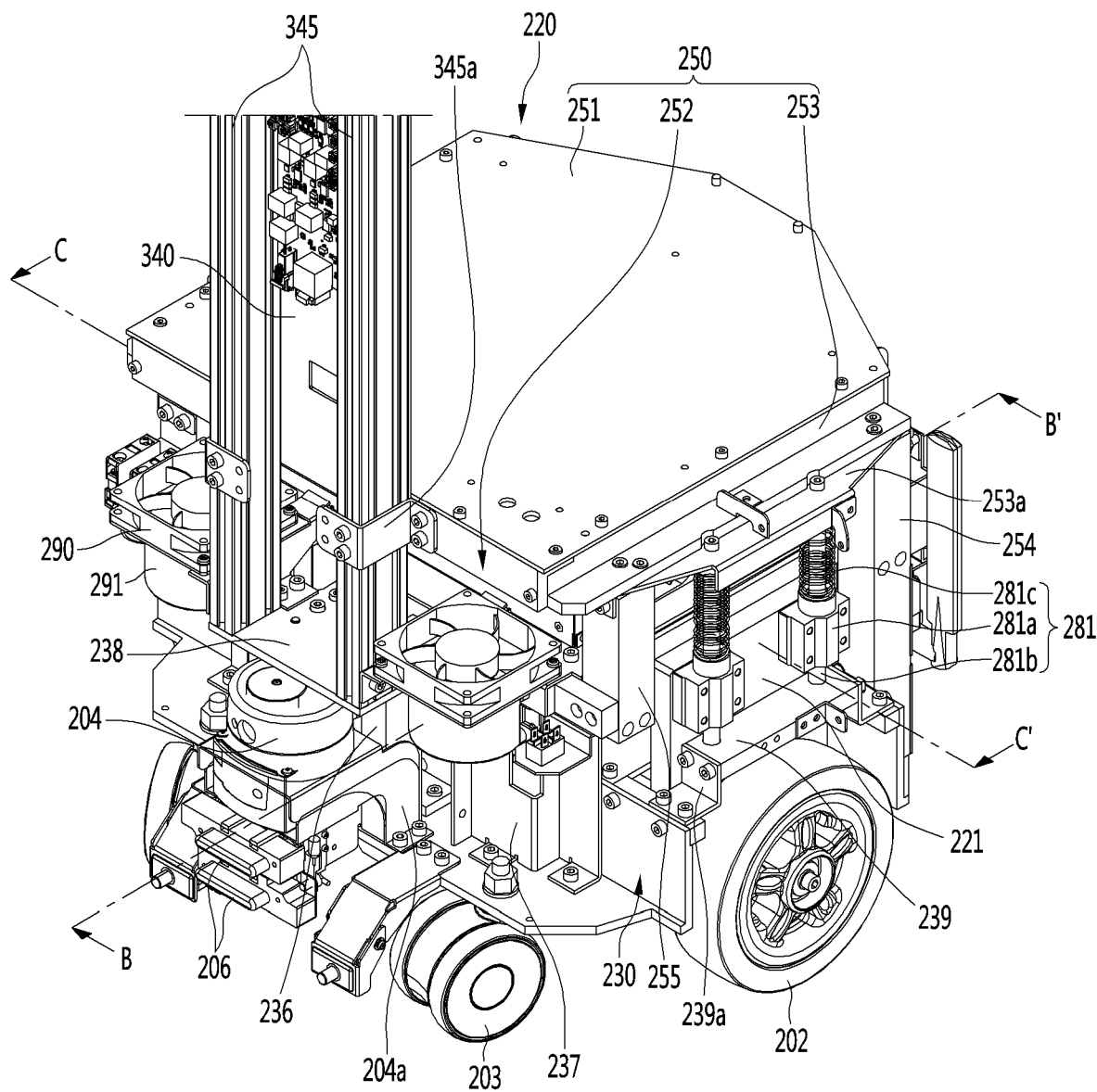
FIG. 10 is a perspective view of the robot illustrating a body frame of the robot according to an embodiment of the present disclosure.
Figure 11:
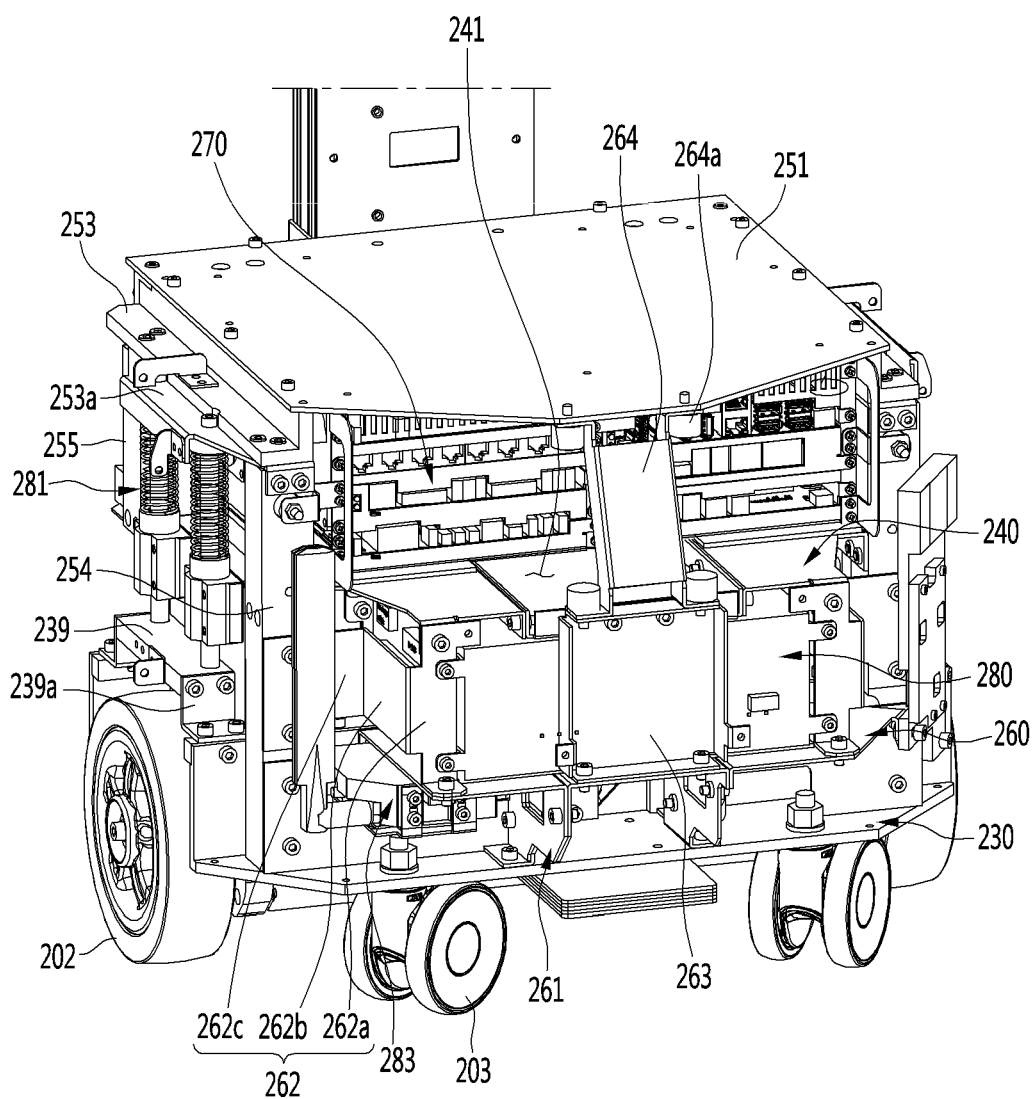
FIG. 11 is a view of the body frame of the robot illustrated in FIG. 10, when viewed from another direction.
Figure 12:
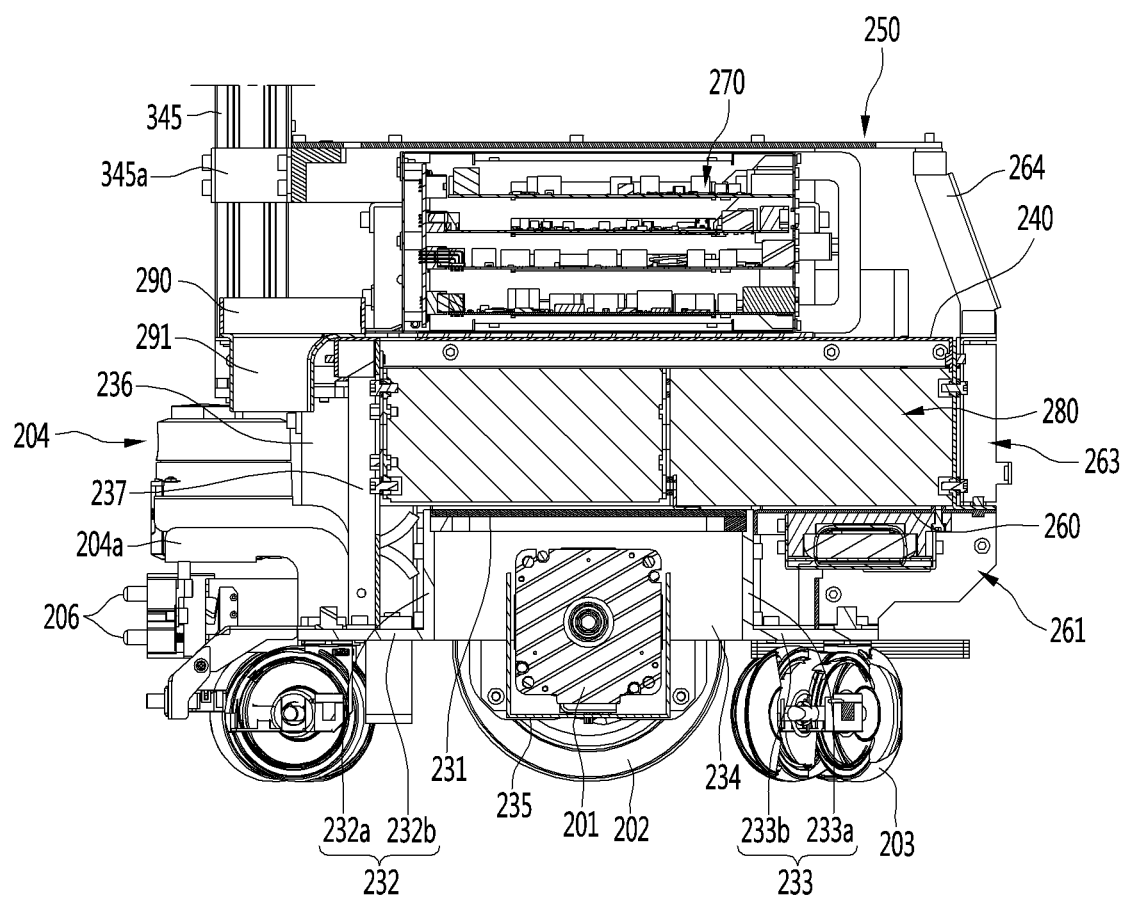
FIG. 12 is a cross-sectional view of the robot taken along line B-B' of FIG. 10.
Figure 13:
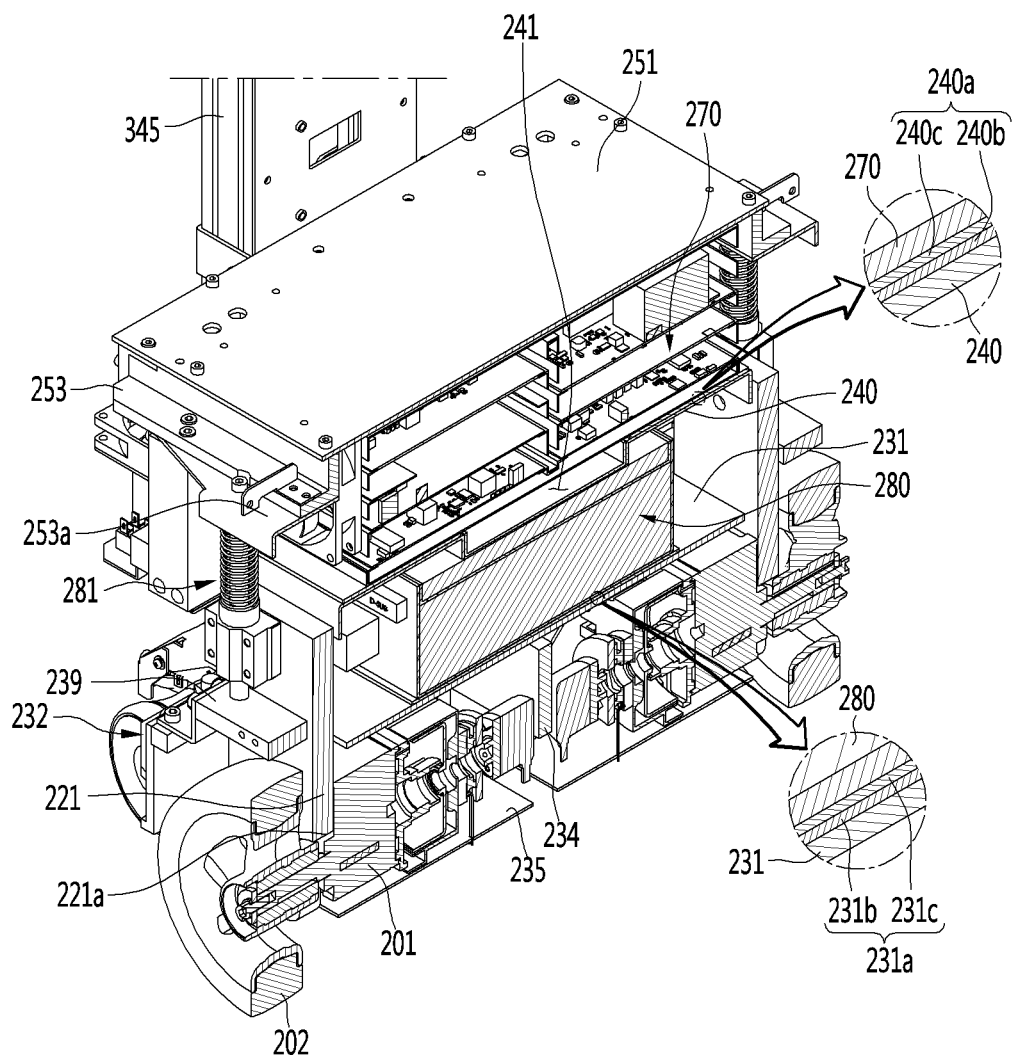
FIG. 13 is a cross-sectional view of the robot taken along line C-C' of FIG. 10.

FIG. 10 is a perspective view of the robot illustrating the body frame according to an embodiment of the present disclosure, FIG. 11 is a view of the body frame of the robot illustrated in FIG. 10, when viewed from another direction, FIG. 12 is a cross-sectional view of the robot taken along line B-B' of FIG. 10, and FIG. 13 is a cross-sectional view of the robot taken along line C-C' of FIG. 10.

The body frame 220 may include a base 230, an inner plate 240 spaced apart from the upper portion of the base 230, and a top cover 250 spaced apart from the upper portion of the inner plate 240.

The base 230 may support the battery 280. That is, the battery 280 may be disposed between the base 230 and the inner plate 240.

The base 230 may include a base plate 231, a first base frame 232 connected to the front end of the base plate 231, and a second base frame 233 connected to the rear end of the base plate 231.

The base plate 231 may be disposed horizontally. The base plate 231 may be formed long in the left-and-right direction and may have a predetermined width in the front-and-rear direction.

The base plate 231 may support the battery 280. In more detail, a first pad 231a contacting the battery 280 may be attached to the upper surface of the base plate 231 (see FIG. 13). For example, the first pad 231a may be attached to the upper surface of the base plate 231 by double-sided tape.

The first pad 231a may include an elastic layer 231b and an insulator layer 231c positioned above the elastic layer 231b.

The elastic layer 231b may include an elastic material such as urethane, rubber, or silicone. Therefore, the elastic layer 231b can reduce the vibration transmitted to the battery 280 when the robot 10a travels.

The insulator layer 231c may contact the battery 280. The insulator layer 231c may have a lower coefficient of friction than that of the elastic layer 231b and the base plate 231. Therefore, the battery 280 can easily slide in contact with the insulator layer 231c. Therefore, the mounting and separation of the battery 280 with respect to the body frame 220 may be facilitated during the maintenance work of the robot 10a.

The first base frame 232 may be coupled to the front edge of the base plate 231. The first base frame 232 may be formed long in the left-and-right direction. The cross-section of the first base frame 232 may have a "L" shape.

In more detail, the first base frame 232 may include a first vertical panel 232a formed vertically and a first horizontal panel 232b bent forward from the lower end of the first vertical panel 232a.

The upper end of the first vertical panel 232a may be connected to the front end of the base plate 231. In addition, the rear end of the first horizontal panel 232b may be connected to the lower end of the first vertical panel 232a. Therefore, the first horizontal panel 232b may be stepped downward with respect to the base plate 231.

The second base frame 233 may be coupled to the rear edge of the base plate 231. The second base frame 233 may be formed long in the left-and-right direction. The cross-section of the second base frame 232 may have a "⌐" shape. The second base frame 232 may be disposed symmetrically with respect to the first base frame 232.

In more detail, the second base frame 233 may include a second vertical panel 233a formed vertically and a second horizontal panel 233b bent rearward from the lower end of the second vertical panel 233a.

The upper end of the second vertical panel 233a may be connected to the rear end of the base plate 231. In addition, the front end of the second horizontal panel 233b may be connected to the lower end of the second vertical panel 233a. Therefore, the second horizontal panel 233b may be stepped downward with respect to the base plate 231.

The driving motor 201 may be disposed on the base 230. In more detail, the driving motor 201 may be positioned below the base plate 231. The driving motor 201 may be positioned between the first base frame 232 and the second base frame 233 in the front-and-rear direction.

The base 230 may be provided with a partition plate 234. The partition plate 234 may partition a space in which one driving motor 201 is provided and a space in which the other driving motor 201 is provided. Further, robot 100a may include a pair of driving motors 201. Therefore, the pair of driving motors 201 may be positioned opposite to each other with respect to the partition plate 234.

The partition plate 234 may be vertical and may be disposed long in the front-and-rear direction. The partition plate 234 may be positioned below the base plate 231. The partition plate 234 may be positioned between the first base frame 232 and the second base frame 233 in the front-and-rear direction. In more detail, the front end of the partition plate 234 may be coupled to the first base frame 232, and the rear end of the partition plate 234 may be coupled to the second base frame 233.

Therefore, the partition plate 234 may reinforce the rigidity of the base 230 in the front-and-rear direction. In addition, the partition plate 234 may prevent the base plate 231 from being sagged (e.g., deformed, bend, etc.) toward the lower side by the load of the battery 280.

The base 230 may be provided with a motor cover 235 configured to surround the driving motor 201. The motor cover 235 may be disposed long in the left-and-right direction. The motor cover 235 may be positioned below the base plate 231 and may be positioned between the first base frame 232 and the second base frame 233 in the front-and-rear direction.

The motor cover 235 may have a box shape in which the upper surface and both side surfaces are opened. In more detail, the motor cover 235 may include a first vertical panel configured to cover the driving motor 201 from the front side, a second vertical panel configured to cover the driving motor 201 from the rear side, and a horizontal panel configured to connect the lower end of the first vertical panel to the lower end of the second vertical panel and cover the driving motor 201 from the lower side.

A pair of side plates 221 positioned at both sides of the base plate 231 may be coupled to the base 230. That is, the pair of side plates 221 may be spaced apart in the left-and-right direction, and the base plate 231 may be positioned between the pair of side plates 221. In addition, a portion of the battery 280 may be positioned between the pair of side plates 221.

The side plate 221 may be disposed vertically. The side plate 221 may protrude upward as compared with the base plate 231.

The lower portion of the side plate 221 may be positioned between the first base frame 232 and the second base frame 233 with respect to the front-and-rear direction.

In addition, the lower portion of the side plate 221 may be positioned between the driving wheel 202 and the driving motor 201 with respect to the left-and-right direction. In more detail, the driving wheel 202 may be positioned outside the side plate 221, and the driving motor 201 may be positioned inside the side plate 221.

A through hole 221a may be defined in the (e.g., each) side plate 221, and the driving wheel 202 and the driving motor 201 may be connected to each other through the through hole 221a.

The base 230 may be provided with neck body supporters 236 and 238 configured to support the neck body 300.

The neck body supporters 236 and 238 may be provided on the upper portion of the first base frame 232, and more specifically, the first horizontal panel 232b. The neck body supporters 236 and 238 may be positioned at the center of the first base frame 232 with respect to the left-and-right direction.

In more detail, the neck body supporters 236 and 238 may include a neck support plate 238 configured to support the neck frame 345 and at least one support pillar 236 configured to support the neck support plate 238. For example, the support pillar 236 may be provided with a pair spaced apart in the left-and-right direction. The support pillar 236 may be positioned between the neck support plate 238 and the first horizontal panel 232b.

Therefore, the loads of the neck body 300 and the head 400 may be smoothly transmitted to the base 230.

The lidar 204 and the terminal 206 may be coupled to the base 230. In more detail, the lidar 204 and the terminal 206 may be coupled to the first base frame 232. In more detail, a mounting bracket 204a to which the lidar 204 and the terminal 206 are mounted may be coupled to the first horizontal panel 232b.

The lidar 204 and the mounting bracket 204a may be positioned below the neck support plate 238 and may be positioned in front of the support pillar 236. The terminal 206 may be positioned below the lidar 204 and may be positioned in front of the support pillar 236 and/or the first base frame 232.

The base 230 may include battery supporters 260 and 261 configured to support the battery 280 together with the base plate 231. The battery supporters 260 and 261 may be provided on the upper portion of the second base frame 233, and more specifically, the second horizontal panel 233b.

In more detail, the battery supporters 260 and 261 may include a battery support plate 260 configured to support the battery 280, and at least one support frame 261 configured to support the battery support plate 260. For example, the support frame 261 may be provided as a pair of support frames 261 spaced apart from each other in the left-and-right direction. The support frame 261 may be positioned between the second horizontal panel 233b and the battery support plate 260.

The battery support plate 260 may be positioned behind the base plate 231. The battery support plate 260 may be positioned at the same height as the base plate 231 without being stepped with the base plate 231. That is, the upper surface of the battery support plate 260 and the upper surface of the base plate 231 may be positioned on one plane.

Therefore, the battery support plate 260 may smoothly support the battery 280 together with the base plate 231. Like the base plate 231, the first pad 231a contacting the battery 280 may be attached to the upper surface of the battery support plate 260.

That is, the first pad 231a may be positioned between the lower surface of the battery 280 and the upper surface of the base plate 231, or may be positioned between the lower surface of the battery 280 and the upper surface of the battery support plate 260.

As described above, the first pad 231a may include an elastic layer 231b and an insulator layer 231c positioned above the elastic layer 231b.

The base 230 may be provided with a communication module 283. The communication module 283 may refer to the communication interface 11 (see FIG. 1) described above.

The communication module 283 may be disposed in the second base frame 233. At least a portion of the communication module 283 may be positioned between the second horizontal panel 233b and the battery support plate 260. In more detail, the communication module 283 may be coupled to the lower surface of the battery support plate 260. A communication module bracket on which the communication module 283 is mounted may be coupled to the lower surface of the battery support plate 260.

The base 230 may be provided with a shock absorber supporter 239 configured to support a shock absorber 281 to be described below.

The shock absorber supporter 239 may have a bar shape that is elongated in the left-and-right direction.

The shock absorber supporter 239 may be provided with a pair spaced side by side. The shock absorber supporter 239 may be positioned outside the side plate 221.

Both ends of the shock absorber supporter 239 may be coupled to the first base frame 232 and the second base frame 233, respectively. In more detail, the front end of the shock absorber supporter 239 may be coupled to the first vertical panel 232a by the coupling bracket 239a, and the rear end of the shock absorber supporter 239 may be coupled to the second vertical panel 233a by the coupling bracket 239a.

Meanwhile, the inner plate 240 may be spaced apart from the upper portion of the base 230, with the battery 280 being disposed therebetween. That is, a battery accommodating space for accommodating the battery 280 may be defined between the inner plate 240 and the base 230.

The inner plate 240 may be formed horizontally. A portion of the inner plate 240 may be positioned above the base plate 231, and the other portion of the inner plate 240 may be positioned above the battery support plate 260.

The inner plate 240 may be supported by the first support frame 237 and the second support frame 262.

The first support frame 237 may be coupled to the front edge of the inner plate 240 to support the inner plate 240.

The first support frame 237 may be coupled to the upper portion of the first base frame 232, and more specifically, the first horizontal panel 232b.

The first support frame 237 may be positioned between the front portion of the inner plate 240 and the first horizontal panel 232b.

The first support frame 237 may be provided as a pair of first support frames 237 spaced side by side. The pair of first support frames 237 may be positioned opposite to the neck body supporters 236 and 238, and more specifically, the support pillars 236.

The second support frame 262 may be coupled to the rear edge of the inner plate 240 to support the inner plate 240. The second support frame 262 may be positioned above the battery support plate 260.

The second support frame 262 may be provided with a pair spaced side by side. The pair of second support frames 262 may be disposed opposite to each other with the battery 280 being disposed therebetween.

In more detail, the second support frame 262 may include a support portion 262a positioned between the inner plate 240 and the battery support plate 260, a bent portion 262b bent forward from the support portion 262a, and a coupling portion 262c connected to the bent portion 262b and coupled to a rear pillar 254 to be described below.

The support portion 262a may be formed approximately vertically. The upper end of the support portion 262a may be coupled to the inner plate 240, and the lower end of the support portion 262a may be coupled to the battery support plate 260. In addition, the support portion 262a may be provided with a coupling hole to which the battery 280 is coupled.

The bent portion 262b may be formed long in the left-and-right direction. The bent portion 262b may be in contact with or adjacent to the side of the battery 280. Therefore, the battery 280 may be fixed between the pair of bent portions 262b with respect to the left-and-right direction.

That is, the second support frame 262 may serve to fix the battery 280 so as not to shake from side to side.

The coupling portion 262c may be formed to be bent from the front end of the bent portion 262b toward the outside. The coupling portion 262c may be coupled to the rear surface of the rear pillar 254 to be described below.

The body frame 220 may be provided with a reinforcing frame 263 positioned behind the battery 280. Therefore, the reinforcing frame 263 may prevent the battery 280 from being separated rearward. In addition, the reinforcing frame 263 may support the inner plate 240 together with the first support frame 237 and the second support frames 262. The reinforcing frame 263 may be coupled to the rear edge of the inner plate 240.

The inner plate 240 may support the control rack 270. In more detail, a second pad 240a contacting the control rack 270 may be attached to the upper surface of the inner plate 240. For example, the second pad 240a may be attached to the upper surface of the inner plate 240 by a double-sided tape.

The second pad 240a may include an elastic layer 240b and an insulator layer 240c positioned above the elastic layer 240b.

The elastic layer 240b may include an elastic material such as urethane, rubber, or silicone. Therefore, the elastic layer 240b can reduce the vibration transmitted to the control rack 270 when the robot 10a travels.

The insulator layer 240c may contact the control rack 270. The insulator layer 240c may have a lower coefficient of friction than that of the elastic layer 240b and the inner plate 240. Therefore, the control rack 270 can easily slide in contact with the insulator layer 240c. Therefore, the control rack 270 may be easily mounted to or separated from the body frame 220 through the opening 212a of the housing 210 (see FIG. 8).

The inner plate 240 may have a stepped portion 241 stepped downward so as to be spaced apart from the lower surface of the control rack 270. The stepped portion 241 may be formed at the center of the inner plate 240 with respect to the left-and-right direction.

The stepped portion 241 may form an air passage through which air can pass along with the lower surface of the control rack 270. The stepped portion 241 may be elongated back and forth and may be opened to the front side. In other words, the air passage may be opened to the front side. Therefore, the air flow generated by the blowing fan 290 to be described below can be easily flowed through the air passage.

In addition, the stepped portion 241 may be in contact with or adjacent to the upper surface of the battery 280. Therefore, the stepped portion 241 may minimize the vertical shaking of the battery 280 and may prevent the inner plate 240 from being sagged downward.

Meanwhile, the top cover 250 may be spaced apart from the upper portion of the inner plate 240, with the control rack 270 being disposed therebetween. That is, the control rack accommodation space in which the control rack 270 is accommodated may be defined between the top cover 250 and the inner plate 240. The top cover 250 may cover the control rack 270 from above.

The top cover 250 may include a top plate 251, a first top frame 252 connected to the front edge of the top plate 251, and a pair of second top frames 253 connected to both edges of the top plate 251.

The top plate 251 may be formed horizontally. The top plate 251 may form the upper surface of the body frame 220.

The first top frame 252 may be formed long in the left-and-right direction. The first top frame 252 may be coupled to the lower surface of the top plate 251.

The first top frame 252 may be coupled to the neck frame 345. In more detail, the reinforcing bracket 345a may couple the neck frame 245 to the first top frame 252. In more detail, the reinforcing bracket 345a may include a first coupling portion coupled to the front surface of the neck frame 345, a second coupling portion coupled to the front surface of the first top frame 252, and a connection portion configured to connect the first coupling portion to the second coupling portion and support the neck frame from the side.

Therefore, the rigidity of the neck frame 345 in the horizontal direction may be improved.

The second top frame 253 may be formed long in the front-and-rear direction. The second top frame 253 may be coupled to the lower surface of the top plate 251. The pair of second top frames 253 may be spaced side by side. Each front end of the pair of second top frames 253 may be connected to each other by the first top frame 252.

The upper portion of the control rack 270 may be positioned between the pair of second top frames 253 with respect to the left-and-right direction. The pair of second top frames 253 may guide the front and rear sliding of the control rack 270.

The connection frame 253a to which the shock absorber 281 to be described below is connected may be coupled to the second top frame 253. The connection frame 253a may be formed to be substantially horizontal and long in the front-and-rear direction. The connection frame 253a may be coupled to the lower surface of the second top frame 253 and protrude outward from the second top frame 253.

Meanwhile, the body frame 220 may further include the shock absorber 281 configured to absorb the shock transmitted to the top cover 250.

The shock absorber 281 may be provided between the base 230 and the top cover 250. In more detail, the shock absorber 281 may be disposed between the shock absorber supporter 239 and the connection frame 253a with respect to the vertical direction.

The shock absorber 281 may prevent the shock generated by the bending of the bottom surface from being transmitted to the service module 900 (see FIG. 5) seated on the upper portion of the top cover 250 during the traveling of the robot 10a.

The shock absorbers 281 may be provided with a plurality of shock absorbers connected to both sides of the top cover 250. For example, the shock absorber 281 may be provided with two pairs connected to both sides of the top cover 250.

The shock absorber 281 may be positioned outside the side plate 221 or the pair of side plates 221.

In more detail, the shock absorber 281 may include a coupling body 281a coupled to the side plate 221, a vertical bar 281b passing through the coupling body 281a to connect the shock absorber supporter 239 to the connection frame 253a, and a spring 281c positioned between the coupling body 281a and the connection frame 253a and disposed at the outer circumference of the vertical bar 281b (see FIG. 10).

The coupling body 281a may be coupled to the outer surface of the side plate 221. The coupling body 281a may be spaced apart from the upper portion of the shock absorber supporter 239.

The vertical bar 281b may be disposed vertically and may pass through the coupling body 281a. The lower end of the vertical bar 281b may be connected to the shock absorber supporter 239, and the upper end of the vertical bar 281b may be connected to the connection frame 253a. In more detail, the upper end of the vertical bar 281b may be connected to the portion of the connection frame 253a that protrudes more outward than the second top frame 253.

The spring 281c may be compressed between the coupling body 281a and the connection frame 253a with respect to the vertical direction. Therefore, the spring 281c can absorb the shock generated when the robot 10a travels.

The separation prevention frame 264 may be coupled to the top cover 250. As described above, the separation prevention frame 264 may be positioned behind the control rack 270 and may be positioned in front of the opening 212a (see FIG. 8).

The separation prevention frame 264 may support the top cover 250. In more detail, the upper end of the separation prevention frame 264 may be coupled to the rear edge of the top plate 251, and the lower end of the separation prevention frame 264 may be coupled to the upper end of the reinforcing frame 263.

The separation prevention frame 264 may be coupled to the top plate 251 and the reinforcing frame 263 by a knob bolt 264a. Therefore, the operator can easily perform the coupling and separation of the separation prevention frame 264 without using a separate tool.

Meanwhile, the body frame 220 may include a plurality of pillars 254 and 255 configured to support the top cover 250 from below.

The plurality of pillars 254 and 255 may be disposed vertically.

The pillars 254 and 255 may support the edge of the top cover 250. In more detail, the plurality of pillars 254 and 255 may support the pair of second top frames 253. The connection frame 253a may be fixed between the pillars 254 and 255 and the second top frame 253.

Therefore, the plurality of pillars 254 and 255 may support the top cover 250 without interfering with the control rack 270 and the battery 280.

The plurality of pillars 254 and 255 may be positioned at both sides of the control rack 270. At least a part of the plurality of pillars 254 and 255 may be in contact with or adjacent to both sides of the control rack 270. Therefore, at least a part of the plurality of pillars 254 and 255 may guide the front and rear movement of the control rack 270.

In more detail, the plurality of pillars 254 and 255 may include a rear pillar 254 and a front pillar 255.

The rear pillar 254 may connect the top cover 250 to the base 230. The rear pillar 254 may be positioned between the top cover 250 and the base 230 in the vertical direction.

The rear pillars 254 may be provided with a pair spaced side by side. The pair of rear pillars 254 may be positioned opposite to each other with the battery 280 and the control rack 270 being disposed therebetween.

The upper end of each rear pillar 254 may be coupled to the second top frame 253 and the lower end of the each rear pillar 254 may be coupled to the second base frame 233.

The front pillar 255 may connect the top cover 250 to the inner plate 240. The front pillar 255 may be spaced apart in front of the rear pillar 254.

The vertical length of the front pillar 255 may be shorter than the vertical length of the rear pillar 254. The front pillar 255 may be spaced apart from the upper portion of the base 230.

The front pillar 255 may be provided with a pair spaced side by side. The pair of front pillars 255 may be positioned opposite to each other with the control rack 270 being disposed therebetween.

The upper end of each front pillar 255 may be coupled to the second top frame 253 and the lower end of each front pillar 255 may be coupled to the inner plate 240 and/or the first support frame 237.

Figure 14:
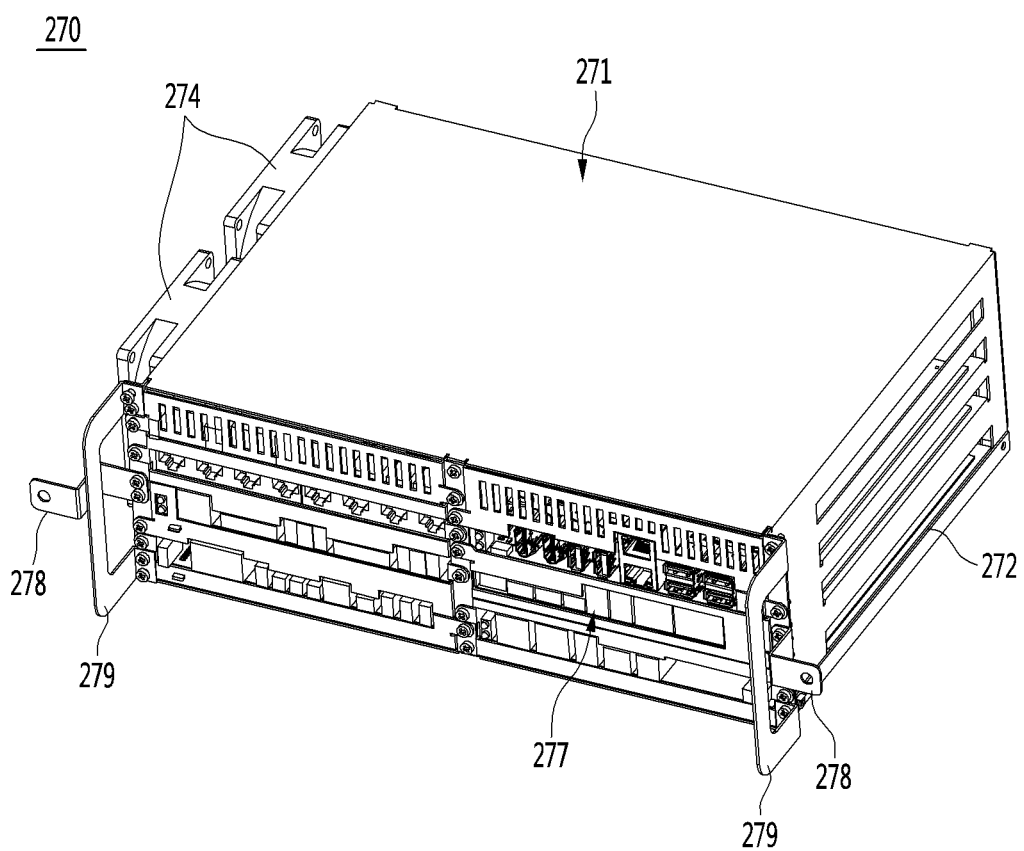
FIG. 14 is a perspective view of a control rack of the robot according to an embodiment of the present disclosure.
Figure 15:
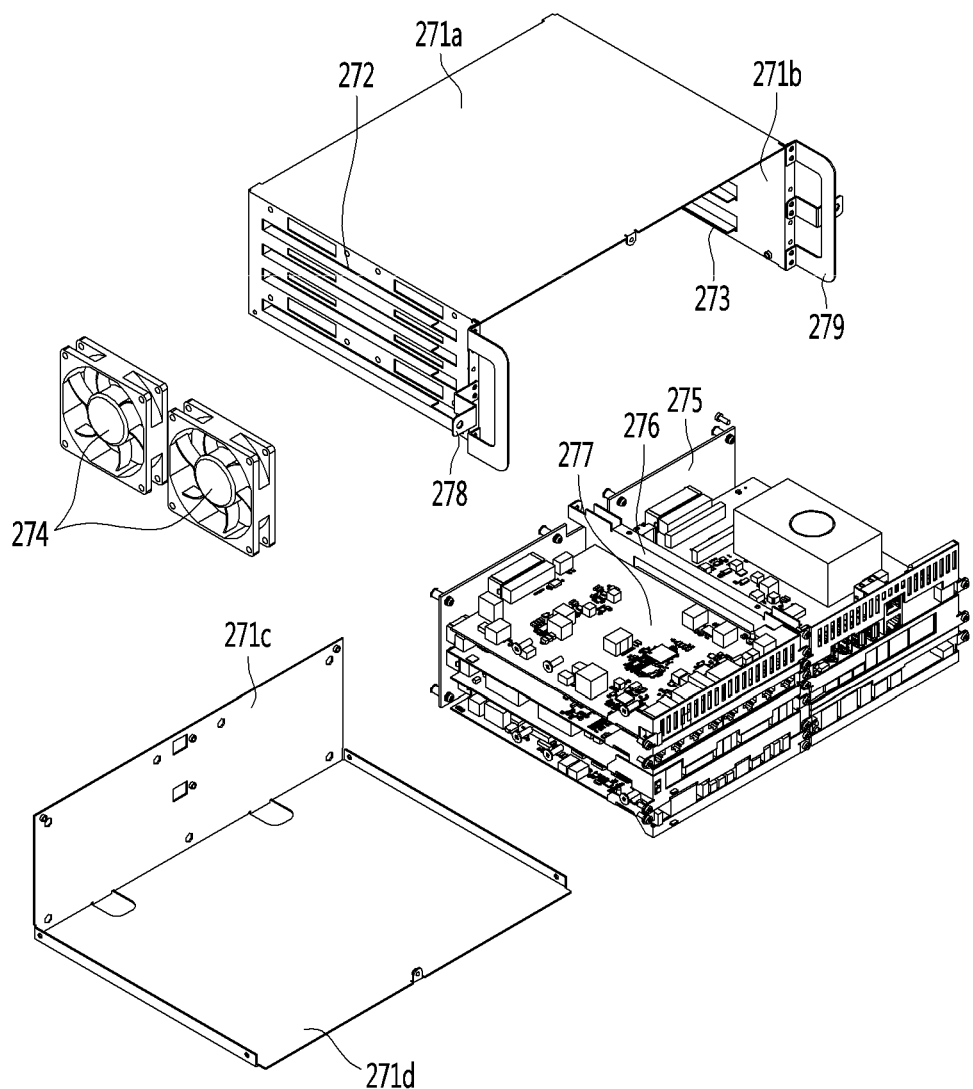
FIG. 15 is an exploded perspective view of the control rack of the robot illustrated in FIG. 14.
Figure 16:
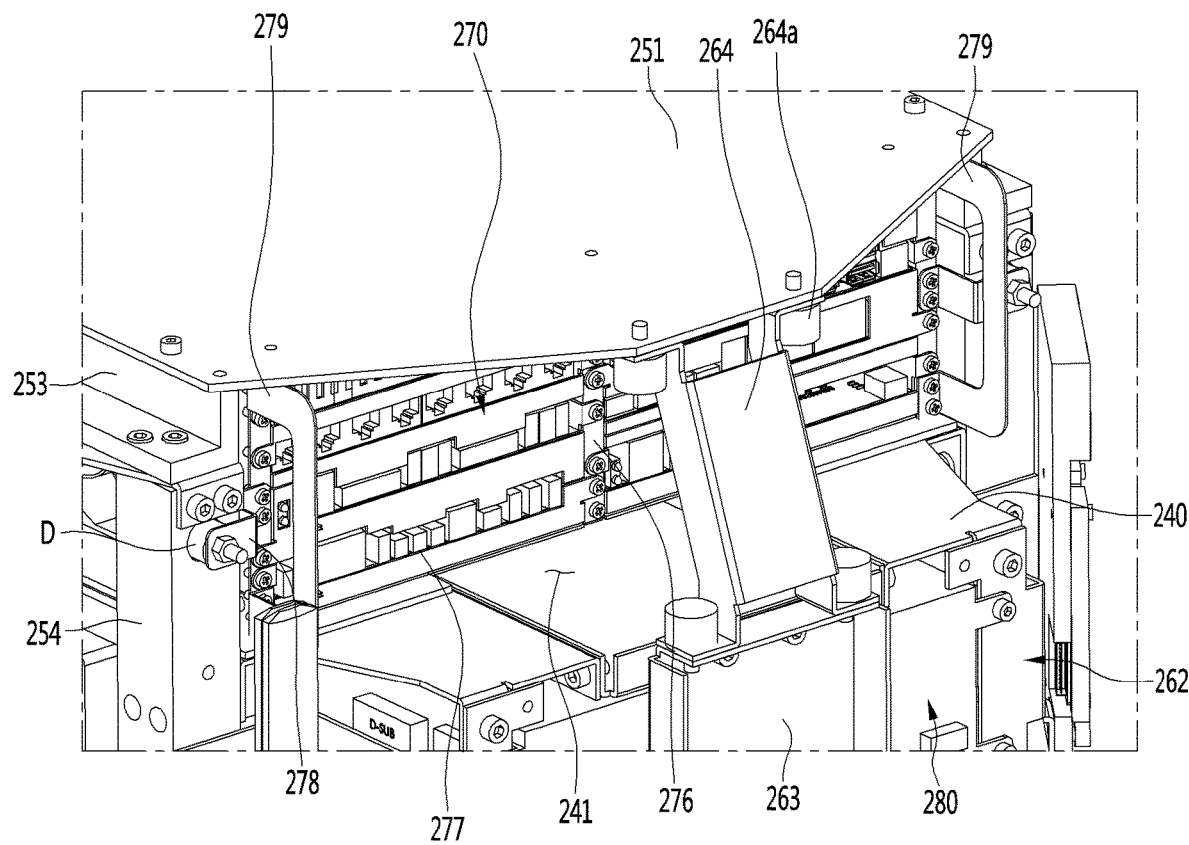
FIG. 16 is a view of the robot for describing coupling between the control rack and the body frame according to an embodiment of the present disclosure.

FIG. 14 is a perspective view of the control rack of the robot according to an embodiment of the present disclosure, FIG. 15 is an exploded perspective view of the control rack of the robot illustrated in FIG. 14, and FIG. 16 is a view for describing coupling between the control rack and the body frame of the robot according to an embodiment of the present disclosure.

The control rack 270 may include a rack housing 271, a plurality of substrates 277 disposed inside the rack housing 271, and a coupling bracket 278 configured to couple the rack housing 271 to the body frame 220. The control rack 270 may further include at least one heat dissipation fan 274.

The rack housing 271 may have a box shape having an opened rear surface. The rack housing 271 may be formed by combining a plurality of members. For example, the rack housing 271 may include an upper cover forming an upper surface 271a and both side surfaces 271b of the rack housing 271, and a lower cover forming a front surface 271c and a lower surface 271d of the rack housing 271.

A through hole 272 (which may be provided in plurality) may be defined at the side surface 271b of the rack housing 271. The through hole 272 may have a long hole shape in the front-and-rear direction.

The heat dissipation fan 274 may be coupled to the side surface 271b of the rack housing 271 and may blow air into the rack housing 271 through the through hole 272. That is, the heat dissipation fan 274 can blow air toward the plurality of substrates 277.

Therefore, heat can be smoothly dissipated from the plurality of substrates 277 positioned in the rack housing 271.

The rack housing 271 may be provided with a pair of handles 279. The pair of handles 279 may be coupled to both rear ends of the rack housing 271, respectively. The user may grip the handle 279 and easily mount the control rack 270 to the body frame 220 or separate the control rack 270 from the body frame 220.

The plurality of substrates 277 may be disposed substantially horizontally in the rack housing 271. The plurality of substrates 277 may be fitted to slots defined in the mounting plate 275 positioned in the rack housing 271. The mounting plate 275 may be positioned in front of the plurality of substrates 277 and may be parallel to the front surface 271c of the rack housing 271.

The plurality of substrates 277 may include various electrical components related to the driving of the robot 10a. For example, the plurality of substrates 277 may include a main control board for controlling overall operation of the robot 10a and a power board electrically connected to the battery 280.

The rack housing 271 may be provided with ribs 273 configured to support the plurality of substrates 277. The ribs 273 may be formed on both inner surfaces of the rack housing 271.

The rib 273 may be formed long in the front-and-rear direction. The ribs 273 may be provided with a plurality of ribs 273 spaced apart in the vertical direction. The outer edge of each substrate 277 may be supported by ribs 273.

The rib 273 may be connected to the lower end of the through hole 272. Therefore, the air flow introduced into the through hole 272 can easily dissipate the heat of the substrate 277.

A substrate supporter 276 configured to support the plurality of substrates 277 may be provided in the rack housing 271. The substrate supporter 276 may have a plate shape that is formed long in the front-and-rear direction and disposed vertically. Ribs (not illustrated) protruding to both sides to support the plurality of substrates 277 may be formed on the substrate supporter 276. The ribs 273 may support the inner edge of each substrate 277.

The ribs 273 formed in the rack housing 271 and the ribs formed in the substrate supporter 276 may support the substrate 277 and guide the back and forth movement of the substrate 277. Therefore, the operator can easily mount or separate the substrate 277 to or from the mounting plate 275.

The coupling bracket 278 may couple the rack housing 271 to the body frame 220. The coupling bracket 278 may include a metal material. The coupling bracket 278 may have a shape bent at least once.

In more detail, the coupling bracket 278 may couple the rear end of the rack housing 271 to the rear pillar 254. In more detail, the coupling bracket 278 may couple the rear ends of both side surfaces 271b of the rack housing 271 to the rear surface of the rear pillar 254.

A damper D may be provided between the coupling bracket 278 and the body frame 220. In more detail, the damper D may be provided between the coupling bracket 278 and the rear pillar 254.

The damper D may include an elastic material to absorb vibration. For example, the damper D may include at least one material of rubber, urethane, or silicone. Therefore, vibration transmitted from the body frame 220 to the control rack 270 may be reduced.

The damper D may have a substantially hollow cylindrical shape. A coupling member such as a bolt or a screw may pass through the damper D to couple the coupling bracket 278 to the rear pillar 254.

The damper D may be a configuration previously included in the coupling member. For example, the coupling member may be a rubber bolt.

Figure 17:
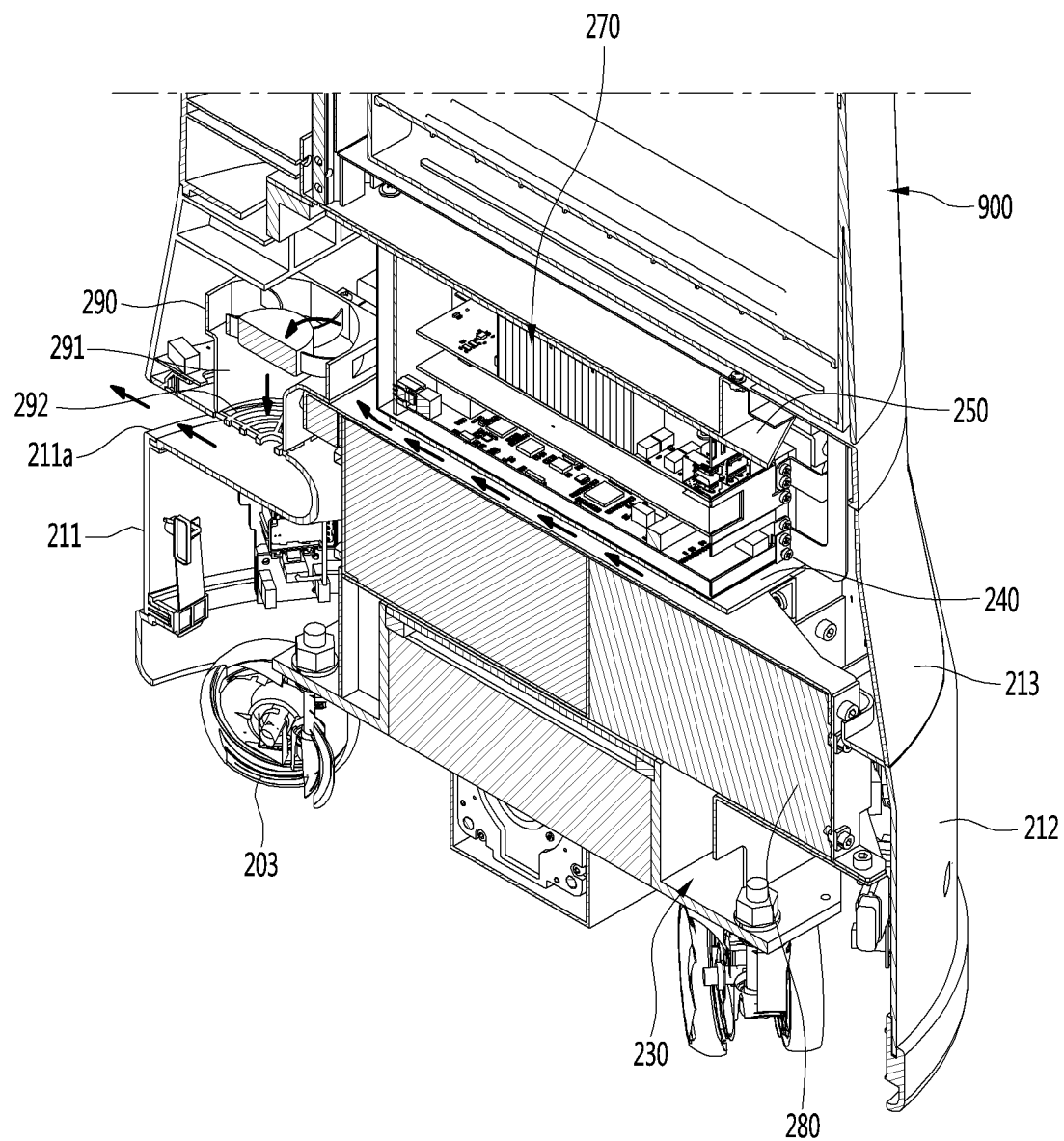
FIG. 17 is a view of the robot illustrating a passage of an air flow discharged from a blowing fan according to an embodiment of the present disclosure.
Figure 18:
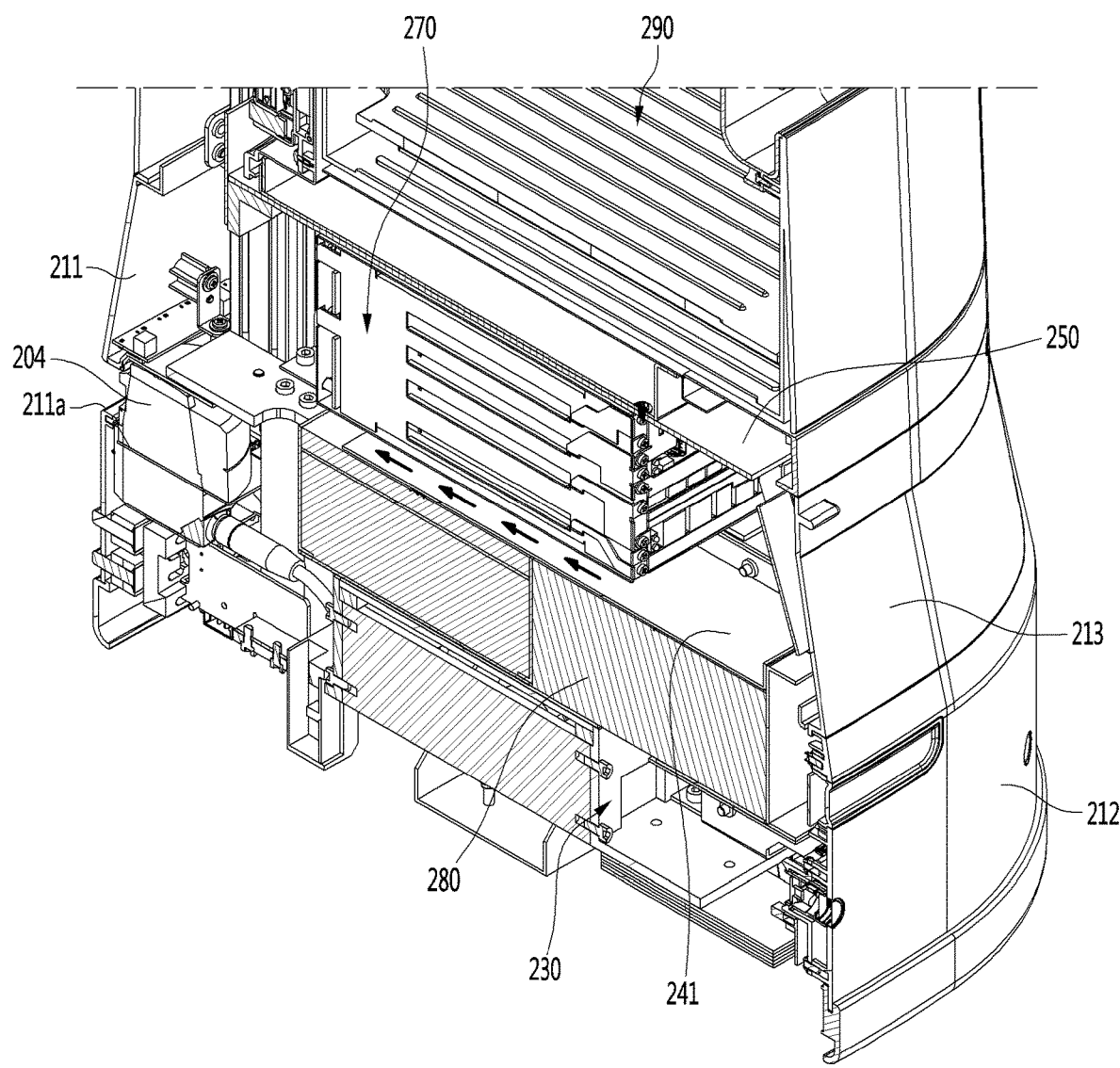
FIG. 18 is a view of the robot illustrating the passage of the air flow passing through the lower portion of the control rack by the blowing fan illustrated in FIG. 17.

FIG. 17 is a view illustrating the passage of the air flow discharged from the blowing fan according to an embodiment of the present disclosure, and FIG. 18 is a view illustrating the passage of the air flow passing through the lower portion of the control rack by the blowing fan illustrated in FIG. 17.

Hereinafter, a description will be given with reference to FIGS. 10, 12, 17, and 18.

The main body 200 may further include a blowing fan 290 and an air guide 291.

The blowing fan 290 may be provided with a pair spaced side by side. The pair of blowing fans 290 may be positioned opposite to each other with the neck frame 345 being disposed therebetween.

The blowing fan 290 may be coupled to at least one of the neck frame 345, the first support frame 237, or the inner plate 240.

The blowing fan 290 may perform heat dissipation in the main body 200. The blowing fan 290 may be disposed horizontally. The blowing fan 290 may suction air from the upper side and blow the air to the lower side.

The air flow may be generated dissipate heat from the inside of the main body 200, the control rack 270, and the battery 280 by the blowing fan 290. A portion of the air flow may pass between the stepped portion 241 of the inner plate 240 and the control rack 270 as illustrated in FIG. 18. Therefore, the control rack 270 and the battery 280 can be heat-dissipated simultaneously, and the inside of the main body 200 can be heat-dissipated quickly and evenly, as compared with the configuration without the stepped portion 241.

In addition, another portion of the air flow may pass between the base 230 and the inner plate 240 as illustrated in FIG. 17. Another portion of the air flow may pass between the inner plate 240 and the top cover 250 to dissipate the heat of the control rack 270.

The air guide 291 may be disposed below the blowing fan 290. The air guide 291 may guide the air flow generated by the blowing fan 290 to the discharge port 292.

The discharge port 292 may be defined in the housing 210. In more detail, the discharge port 292 may be defined in the upper surface of the recessed portion 211a formed in the front housing 211. A discharge grill may be disposed in the discharge port 292.

Therefore, the air flow blown from the blowing fan 290 may pass through the air guide 291, the discharge port 292, and the recessed portion 211a in sequence and may be discharged to the outside of the main body 200.

In addition, since the discharge port 292 is defined in the recessed portion 211a, the discharge port 292 is not visible from the outside of the main body 200, so that the appearance of the main body 200 may be improved.

Figure 19:
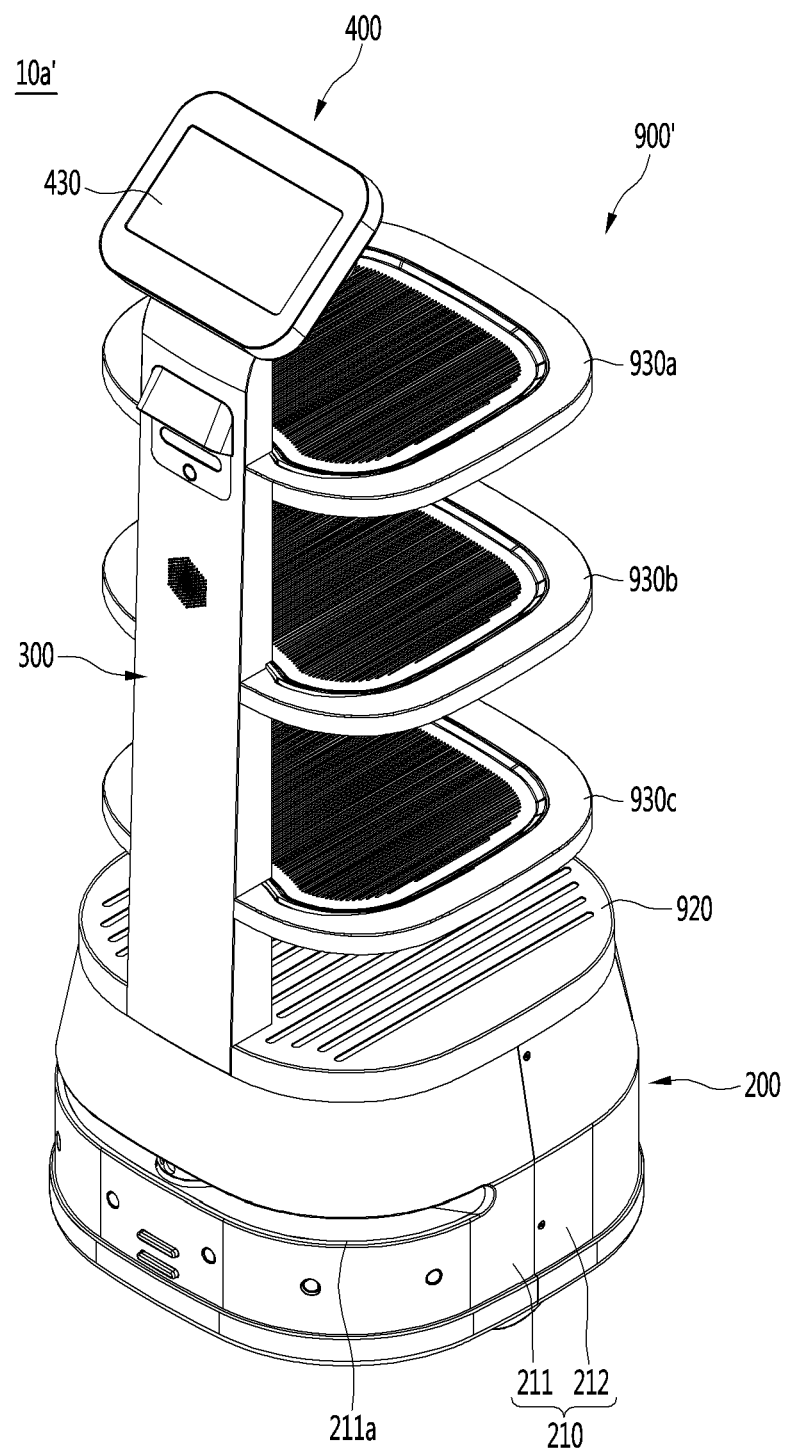
FIG. 19 is a perspective view of a robot according to another embodiment of the present disclosure.
Figure 20:
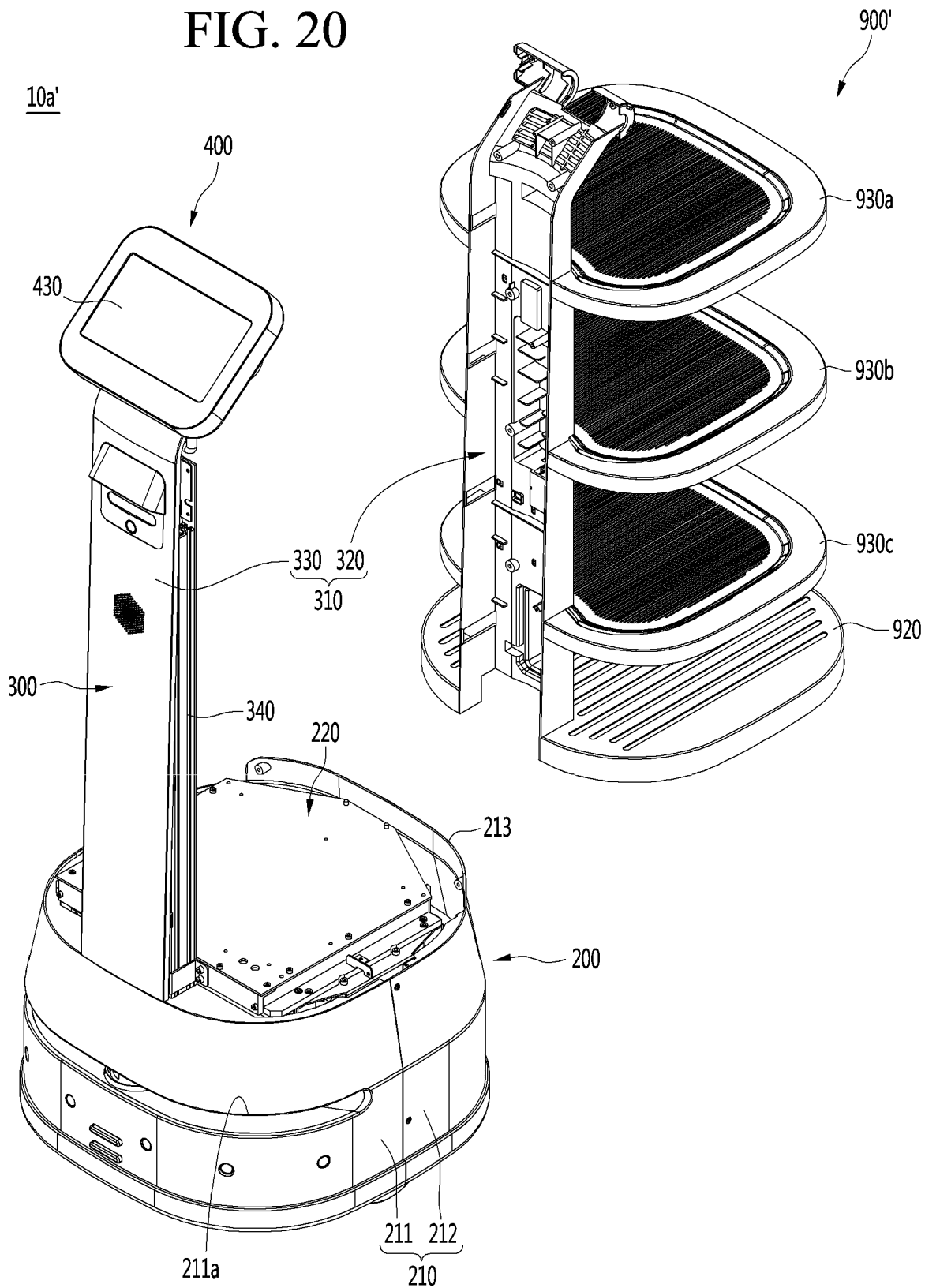
FIG. 20 is a view of the robot illustrating a service module separated from the robot illustrated in FIG. 19.

FIG. 19 is a perspective view of a robot according to another embodiment of the present disclosure, and FIG. 20 is a view illustrating a service module separated from the robot illustrated in FIG. 19.

Since a robot 10a' according to the present embodiment is the same as the robot 10a of the above-described embodiment, except for a service module 900', a redundant description thereof will be omitted and a differences will be mainly described.

The service module 900' according to the present embodiment may include a base 930 and a plurality of shelves 930a, 930b, and 930c.

The base 920 may be disposed horizontally. The base 920 may cover the opened upper surface of the housing 210 of the main body 200 from above. The base 920 may cover a body frame 220 from above.

A groove covered by the back cover 213 may be formed on the rear surface of the base 920. Like the groove 901 (see FIG. 7) of the above-described embodiment, the groove may form an entrance/exit port through which the control rack 270 can enter and exit together with the opening 212a defined in the rear housing 212.

The lower end of the rear case 320 of the neck housing 310 may be connected to the front edge of the base 920.

The plurality of shelves 930a, 930b, and 930c may be coupled at the rear side of the rear case 320. The plurality of shelves 930a, 930b, and 930c may be positioned at different heights. The plurality of shelves 930a, 930b, and 930c may be spaced apart from each other vertically.

The shelf 930c positioned at the lowest height among the plurality of shelves 930a, 930b, and 930c may be spaced apart from the upper side of the base 920.

The robot 10a may autonomously travel in a state in which articles are placed on the base 920 and the plurality of shelves 930a, 930b, and 930c.

According to a preferred embodiment of the present disclosure, only the back cover can be removed from the housing to access the inside of the main body. Therefore, the maintenance of the inside of the main body is facilitated.

In addition, since the control rack is accessible through the opening covered by the back cover, the operator can easily detach the control rack from the body frame through the opening, or can easily attach the maintained control rack to the body frame through the opening.

In addition, the top cover may be spaced apart from the upper portion of the inner plate. Therefore, the space in which the control rack is accommodated may be defined between the top cover and the inner plate, and the control rack may be supported by the inner plate.

In addition, the pad including the elastic layer and the insulator layer may be attached to the upper surface of the inner plate. Therefore, the vibration transmitted to the control rack may be reduced, and the front and rear sliding of the control rack may be smooth.

In addition, the plurality of pillars may support the top cover and guide the front and rear movement of the control rack. This eliminates the need for a separate guide component and simplifies the internal construction of the robot.

In addition, the separation prevention frame may support the top cover and may be positioned at the rear side of the control rack. Therefore, the separation prevention frame can prevent the control rack from being separated rearward.

In addition, the separation prevention frame may be coupled to the top cover by the knob bolt. Therefore, the operator can easily separate the separation prevention frame through the opening of the housing without using a separate tool.

In addition, since the control rack is provided with the heat dissipation fan, the heat can be smoothly dissipated from the plurality of substrates.

In addition, the damper including the elastic material may be provided between the body frame and the coupling bracket provided in the control rack. Therefore, vibrations transmitted from the body frame to the control rack may be reduced.

In addition, the inner plate may be provided with the stepped portion stepped downward. This can increase the rigidity of the inner plate.

In addition, the air flow passing through the stepped portion may be generated by the blowing fan and the air guide. Therefore, the heat can be quickly dissipated from the control rack.

In addition, the battery may be provided between the base and the inner plate. Therefore, the center of gravity of the main body is located below, and the robot can travel stably.

In addition, the stepped portion formed on the inner plate may be adjacent to the upper surface of the battery. Therefore, the battery can be fixed in the vertical direction and the sag of the inner plate can be prevented.

In addition, the pad including the elastic layer and the insulator layer may be attached to the upper surface of the base. Therefore, vibration transmitted to the battery can be reduced, and the front and rear sliding of the battery can be smoothed when the battery is replaced.

In addition, the reinforcing frame may support the inner plate and may be positioned at the rear side of the battery. Therefore, the reinforcing frame can prevent the battery from be separated rearward.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to describe the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

In addition, a handle 216 may be defined in the back cover 213. The handle 216 may be defined in the upper portion of the back cover 213. The user may grip the handle 216 and easily separate the back cover 213 from the rear housing 212.

What is claimed is:

1. A robot, comprising:
a housing having a rear side;
a body frame disposed inside the housing;
a driving motor provided at a lower portion of the body frame;
a driving wheel configured to be rotated by the driving motor and protruding downward from the housing;
a control rack mounted to the body frame and positioned above the driving motor;
an opening positioned at a rear side of the control rack; and
a back cover configured to cover the opening,
wherein the control rack is removable through the opening.

2. The robot according to claim 1, wherein the body frame comprises:
a base;
an inner plate spaced upward from the base and configured to support the control rack; and
a top cover spaced upward from the inner plate, and
wherein the control rack is disposed between the inner plate and the top cover.

3. The robot according to claim 2, wherein a pad is attached to an upper surface of the inner plate, and
wherein the pad comprises:
an elastic layer having an elastic material; and
an insulator layer positioned above the elastic layer, the insulator layer contacting the control rack and having a coefficient of friction lower than a coefficient of friction of the elastic layer.

4. The robot according to claim 2, wherein the body frame further comprises a plurality of pillars configured to support the top cover, and
wherein the plurality of pillars is positioned at two sides of the control rack.

5. The robot according to claim 4, wherein at least a portion of the plurality of pillars guide front and rear movement of the control rack.

6. The robot according to claim 2, wherein the body frame further comprises a separation prevention frame configured to support the top cover, and
wherein the separation prevention frame is positioned behind the control rack and in front of the opening.

7. The robot according to claim 6, wherein the separation prevention frame is coupled to the top cover of the body frame by a fastener.

8. The robot according to claim 2, wherein the inner plate is provided with a stepped portion that is stepped downward so as to be spaced apart from a bottom surface of the control rack.

9. The robot according to claim 8, further comprising:
a blowing fan configured to generate an air flow passing between the stepped portion and the control rack, the blowing fan being positioned in front of the control rack; and
an air guide configured to guide the air flow generated by the blowing fan to a discharge port defined in the housing.

10. The robot according to claim 9, wherein a front surface of the housing is provided with a recessed portion,
wherein a lidar is disposed in the recessed portion of the front surface of the housing, and
wherein the discharge port is defined on an upper surface of the recessed portion.

11. The robot according to claim 1, wherein the control rack comprises:
a rack housing having an opened back surface;
a plurality of substrates disposed inside the rack housing; and
a coupling bracket coupling a rear end of the rack housing to the body frame.

12. The robot according to claim 11, wherein the rack housing includes a through hole, and
wherein the control rack further comprises a heat dissipation fan coupled to the rack housing and configured to blow air to the plurality of substrates through the through hole of the rack housing.

13. The robot according to claim 11, further comprising a damper provided between the coupling bracket and the body frame.

14. The robot according to claim 1, further comprising a battery mounted to the body frame,
wherein the battery is positioned above the driving motor and below the control rack.

15. A robot, comprising:
a housing having a rear side;
a base disposed inside the housing;
a driving motor disposed on the base;
a driving wheel configured to be rotated by the driving motor and protruding downward from the housing;
an inner plate spaced upward from the base;
a top cover spaced upward from the inner plate;
a battery disposed between the base and the inner plate;
a control rack disposed between the inner plate and the top cover;
an opening positioned at a rear side of the control rack; and
a back cover configured to cover the opening,
wherein the control rack is removable through the opening.

16. The robot according to claim 15, further comprising:
a plurality of pillars, each of the plurality of pillars having an upper end coupled to the top cover and a lower end coupled to the base or the inner plate,
wherein the plurality of pillars is positioned outside the control rack or the battery in a horizontal direction.

17. The robot according to claim 15, wherein the inner plate is provided with a stepped portion that is stepped downward so as to be spaced apart from a bottom surface of the control rack, and
wherein an upper surface of the battery is adjacent to the stepped portion.

18. The robot according to claim 15, wherein an upper surface of the base includes a first pad contacting the battery,
wherein an upper surface of the inner plate includes a second pad contacting the control rack, and
wherein each of the first pad and the second pad comprises:
an elastic layer having an elastic material; and
an insulator layer positioned above the elastic layer, the insulator layer having a coefficient of friction lower than a coefficient of friction of the elastic layer.

19. The robot according to claim 15, further comprising:
a reinforcing frame configured to support the inner plate and positioned at a rear side of the battery; and
a separation prevention frame configured to support the top cover,
wherein the separation prevention frame is positioned behind the control rack and in front of the opening.

20. The robot according to claim 15, wherein the control rack comprises:
a rack housing having an opened back surface;
a plurality of substrates disposed inside the rack housing; and
a coupling bracket coupling a rear end of the rack housing to the body frame.

* * * * *